(12) United States Patent
Taketani et al.

(10) Patent No.: US 8,580,903 B2
(45) Date of Patent: Nov. 12, 2013

(54) FLAME RETARDANT, PRODUCTION METHOD THEREFOR, AND FLAME RETARDANT THERMOPLASTIC RESIN COMPOSITION COMPRISING THE SAME

(75) Inventors: Shuji Taketani, Settsu (JP); Hidekazu Kawakubo, Settsu (JP); Noriyuki Suzuki, Settsu (JP); Tetsuro Yamamoto, Settsu (JP); Yutaka Kaneda, Settsu (JP)

(73) Assignee: Kaneka Corporation, Osaka-shi (JP)

( * ) Notice: Subject to any disclaimer, the term of this patent is extended or adjusted under 35 U.S.C. 154(b) by 0 days.

(21) Appl. No.: 13/391,885

(22) PCT Filed: Aug. 24, 2010

(86) PCT No.: PCT/JP2010/064274
§ 371 (c)(1),
(2), (4) Date: Feb. 23, 2012

(87) PCT Pub. No.: WO2011/024806
PCT Pub. Date: Mar. 3, 2011

(65) Prior Publication Data
US 2012/0157632 A1 Jun. 21, 2012

(30) Foreign Application Priority Data

Aug. 24, 2009 (JP) ................. 2009-193206
Nov. 6, 2009 (JP) ................. 2009-254651
Mar. 25, 2010 (JP) ................. 2010-069891
Aug. 10, 2010 (JP) ................. 2010-179569

(51) Int. Cl.
*C08F 26/06* (2006.01)
*C08F 8/00* (2006.01)
*C08F 8/30* (2006.01)
*C08L 67/02* (2006.01)
*C08G 73/02* (2006.01)

(52) U.S. Cl.
USPC .......... 526/261; 525/152; 525/175; 525/182; 525/185

(58) Field of Classification Search
USPC .................. 525/152, 175, 182, 185; 526/261
See application file for complete search history.

(56) References Cited

U.S. PATENT DOCUMENTS 4,962,168 A 10/1990 Hiratsuna et al.

FOREIGN PATENT DOCUMENTS

JP 2-182707 A 7/1990
JP 5-086253 A 4/1993
(Continued)

OTHER PUBLICATIONS

International Search Report of PCT/JP2010/064274, mailing date Oct. 26, 2010.

*Primary Examiner* — William Cheung
(74) *Attorney, Agent, or Firm* — Westerman, Hattori, Daniels & Adrian, LLP

(57) ABSTRACT

The aim is to provide a flame retardant for thermoplastic resins that has a high flame-retardant imparting effect, and that produces a thermoplastic resin composition with superior moldability and workability that does not easily bleed out and a molded body with superior resistance to heat-moisture and chemicals; and a flame retardant for thermoplastic resins that has a high flame-retardant imparting effect, and that produces a flame retardant with a heat resistance to working temperatures of 300° C. or higher and a molded body with superior resistance to reflow heat and chemicals. Disclosed is a flame retardant, which is a specific flame retardant for thermoplastic resins comprising the reaction product of a nitrogen-containing compound and a phosphorous-containing compound, that is insoluble in toluene and comprises in the range of 5 to 10 wt % of phosphorus atoms. The aforementioned flame retardant may have a weight average molecular weight (Mw) in the range of 2,000 to 10,000, or may have a ratio of at least 1 wt % of crosslinking components within the flame retardant components.

10 Claims, 1 Drawing Sheet

(56) References Cited

FOREIGN PATENT DOCUMENTS

| | | |
|---|---|---|
| JP | 2001-192565 A | 7/2001 |
| WO | 2007/040075 A1 | 4/2007 |
| WO | 2008/119693 A1 | 10/2008 |
| WO | WO 2008/119693 A1 * | 10/2008 |

* cited by examiner

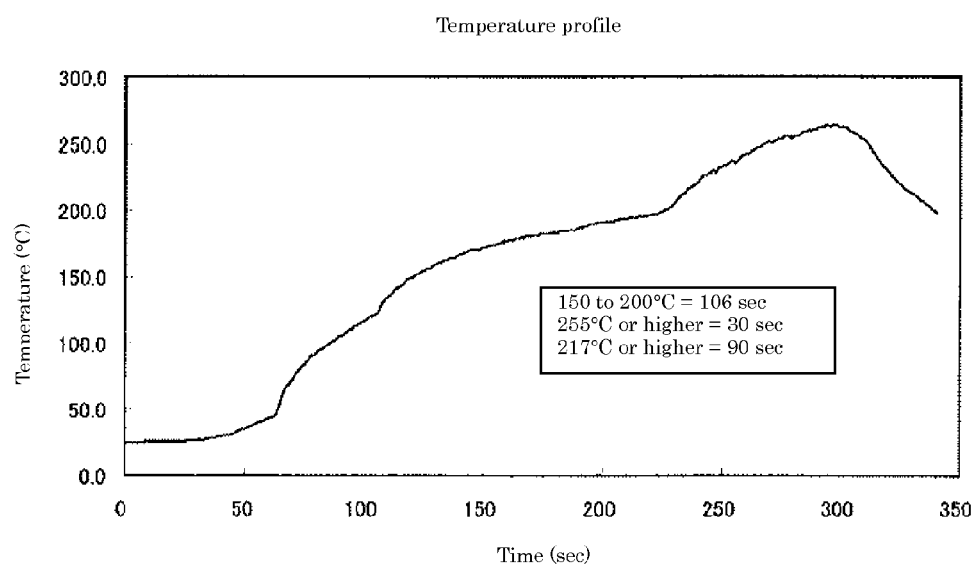

FLAME RETARDANT, PRODUCTION METHOD THEREFOR, AND FLAME RETARDANT THERMOPLASTIC RESIN COMPOSITION COMPRISING THE SAME

This application is the International Stage of PCT Application No. PCT/JP2010/064274 filed Aug. 24, 2010, which claims priority of Japan Patent Application No. 2009-193206 filed Aug. 24, 2009, Japan Patent Application No. 2010-179569 filed Aug. 10, 2010, Japan Patent Application No. 2010-069891 filed Mar. 25, 2010, and Japan Patent Application No. 2009-254651, filed Nov. 6, 2009.

TECHNICAL FIELD

The present invention relates to a flame retardant, a production method therefor, and a flame-retardant thermoplastic resin composition comprising the same.

BACKGROUND ART

Recently, a variety of synthetic resin materials have been used for production of housings and parts for OA devices and home appliances, connectors, auto parts, construction materials, household articles, fiber products and others. However, synthetic resin materials, which are inflammable, often need to have flame retardancy for assurance of fire safety, especially when used as home appliances, electric/electronic parts, and OA-related parts, and blending of various flame retardants is under study for that purpose.

A method of using a halogen-based flame retardant such as brominated polystyrene and an antimony-based flame retardant such as antimony trioxide in combination is known as the method to make a resin flameproofed, but such a flame retardant may generate toxic gas on combustion, and thus regulations on resin compositions containing halogen-based flame retardants got severer than before. For that reason, developments for non-halogen flame retardants are intensively in progress.

Methods of making a resin composition flameproofed without using a halogen-based flame retardant include, for example, those by using a metal hydroxide and by using a phosphorus compound. In the case of the method of using a metal hydroxide, it is possible to obtain desired flame retardancy only by using it in a large amount, but use of it in a large amount unfavorably causes a problem of deterioration of the properties inherent to the resin.

Methods of using an organic (condensed) phosphate ester compound and also by using red phosphorus were known as the methods of making a resin flameproofed by using a phosphorus compound. Relatively low-molecular-weight organic (condensed) phosphate esters are unsatisfactory from the points of volatility, sublimability, and heat resistance and have a problem that the flame retardants bleed out when the resin composition containing the same is used at high temperature for an extended period of time. Red phosphorus causes a problem that toxic phosphine gas is generated during drying and molding of the resin composition.

In addition, in the case of high-heat-resistance nylon resins demanding a processing temperature of 300° C. or higher, there is currently no phosphorus-based flame retardant that can withstand the processing temperature, and metal salts of dialkylphosphinic acid, only flame retardants that are considered sufficiently heat-resistant, had a problem that they cause corrosion of the metal regions of the extruders and injection molding machines such as cylinders and screws. Further, high-heat-resistance nylon resin compositions should be superior in heat resistance on reflow process, for example when used in connector application, but there is still no non-halogen flame retardant that has sufficient heat resistance on reflow process.

Patent Document 1 discloses a method of producing a flame-retardant triallyl isocyanurate prepolymer, characterized in that, in preparation of the prepolymer by polymerization of triallyl isocyanurate, as a controlling agent of polymerization, 6H-dibenz[c,e]-[1,2]-oxaphosphorin (molecular weight: 216.17) is added together with a polymerization initiator to the triallyl isocyanurate in an amount of 1 to 200% by weight.

Alternatively, Patent Document 2 describes a composition comprising a phosphorus-containing compound having a particular structure and an amorphous resin, which is improved in bleed-out resistance, but deterioration of the bleed-out resistance and the physical properties thereof under high-humidity high-heat condition is yet to be improved.

CITATION LIST

Patent Literature

Patent Document 1: JP-A No. 02-182707
Patent Document 2: WO 07/040,075

SUMMARY OF INVENTION

Technical Problem

The object of the present invention is to provide a thermoplastic resin composition superior in flame retardancy and also in bleed-out resistance and giving thermoplastic resin compositions superior in moldability and moldings superior in moist-heat resistance and chemical resistance, and a flame retardant for thermoplastic resins having high flame retardancy and showing heat resistance at a processing temperature of 300° C. or higher, giving moldings superior in heat resistance on reflow process and chemical resistance.

Solution to Problem

The inventors have studied intensively on the method of obtaining a flame retardant for thermoplastic resins, and consequently for thermoformable resin compositions, having favorable properties as additive, which is prepared from the raw materials identical with those for the triallyl isocyanurate-based flame-retardant prepolymer described in Patent Document 1 and has improved flame retardancy and consistent or improved moldability and gives moldings with non-deteriorated chemical resistance. The inventors have also studied intensively on the method of obtaining a flame retardant for thermoplastic resins, and consequently for thermoformable resin compositions, having favorable properties as additive, which is prepared from the raw materials identical with those for the triallyl isocyanurate-based flame-retardant prepolymer described in Patent Document 1 and designed to have a structure to show favorable flame retardancy as it is and to give favorable flame retardancy to a thermoplastic polymer when added thereto and gives a molding in the composition with non-deteriorated heat resistance on reflow process and chemical resistance.

As a result, the inventors have found that it is possible to obtain a more favorable flame retardant for thermoplastic resins superior in flame retardancy and also in chemical resistance, by making the flame retardant contain a particular phosphorus/nitrogen-containing flame-retardant compound obtained by the production method of the present invention and increasing the phosphorus atom content therein.

They have also found that it is possible to obtain a more favorable flame retardant for thermoplastic resins superior in flame retardancy and also in heat resistance on reflow process, and chemical resistance, by making the flame retardant contain a particular phosphorus/nitrogen-containing flame-retardant compound obtained by the production method of the present invention and have a crosslinked structure and increasing the phosphorus atom content therein.

Thus, the present invention relates to a flame retardant for thermoplastic resins, comprising a reaction product of a nitrogen-containing compound represented by structural formulae (1) and a phosphorus-containing compound represented by structural formula (2), wherein the flame retardant is insoluble in toluene and has a phosphorus atom content of 5 to 10 wt %.

[Formula 1]

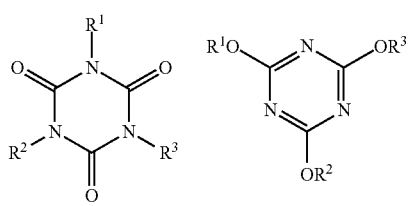

Structural formulae (1)

(wherein, two or more of $R^1$, $R^2$, and $R^3$ are unsaturated bond-containing groups and the other is a hydrogen atom or an organic group other than unsaturated bond-containing groups).

[Formula 2]

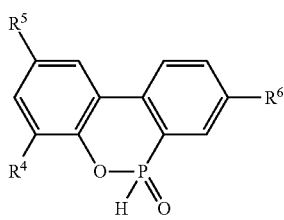

Structural formula (2)

(wherein, $R^4$, $R^5$, and $R^6$ each are independently a hydrogen atom or an alkyl, cycloalkyl, aryl or aralkyl group).

The flame retardant of the present invention having such a phosphorus content is superior in flame retardancy. On the other hand, the triallyl isocyanurate flame-retardant prepolymer described in Patent Document 1 contains a compound represented by structural formula (2) as a controlling agent of polymerization, but the phosphorus content is not designed to be as high as that in the present invention. In addition, since the polymerization method used is different from the polymerization method of the present invention described below, the phosphorus content is smaller than that of the present invention. Thus, the flame retardant prepolymer seems to show insufficient flame retardancy when added to a thermoplastic resin.

In addition, the flame retardant of the present invention is insoluble in toluene. Further, it is preferable that it is insoluble in tetrahydrofuran (THF) as well. The reason is that the flame retardant of the present invention should have preferable properties as an additive, to make the blended resin have consistent or improved moldability when added to a resin composition and giving moldings undeteriorated in chemical resistance, as described above. On the other hand, the triallyl isocyanurate flame-retardant prepolymer described in Patent Document 1 should have favorable solubility in solvent for that purpose and thus should be soluble in common solvents such as toluene, xylene, benzene, tetrahydrofuran, ethanol, isopropanol, and isobutanol.

In a favorable embodiment, the flame retardant above has a weight-average molecular weight (Mw) of 2,000 to 10,000. When the weight-average molecular weight is in the range above, the flame retardant is resistant to bleed out and also to transpiring during molding under heat.

In a more favorable embodiment, it is a flame retardant having a ratio (Mw/Mn) of the weight-average molecular weight (Mw) and the number-average molecular weight (Mn) at 1 to 1.5. When the ratio is in the range above, the advantageous effects of the present invention effect on flame retardancy, moldability, chemical resistance and others described above are amplified and it becomes a flame retardant with uniform properties. It gets thus possible to blend it to a base resin uniformly during melt blending, thus effectively preventing unfavorable molding caused by addition of a high-molecular weight compound and also preventing transpiring of low-molecular weight compounds during molding.

The present invention relates to a flame retardant for thermoplastic resins, comprising a polymer having the first to third repeating units respectively represented by structural formulae (3) to (5), characterized in that the flame retardant is insoluble in toluene and has a phosphorus atom content of 5 to 10 wt % and a weight-average molecular weight (Mw) of 2,000 to 10,000.

[Formula 3]

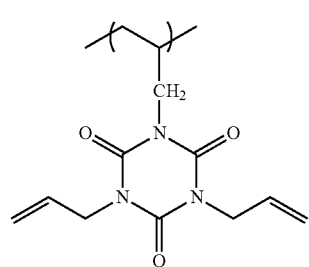

Structural formulae (3)

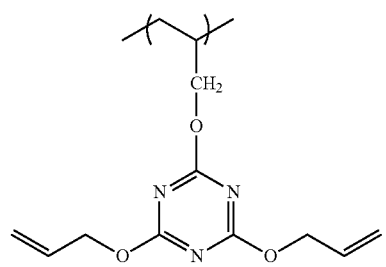

[Formula 4]
Structural formulae (4)
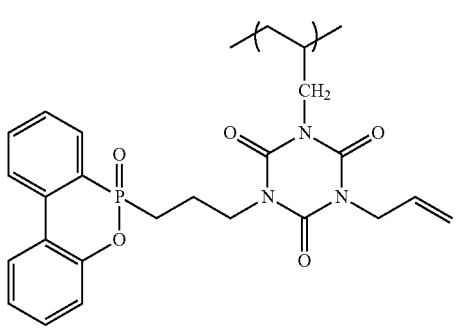
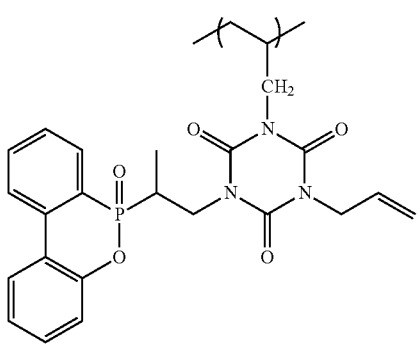
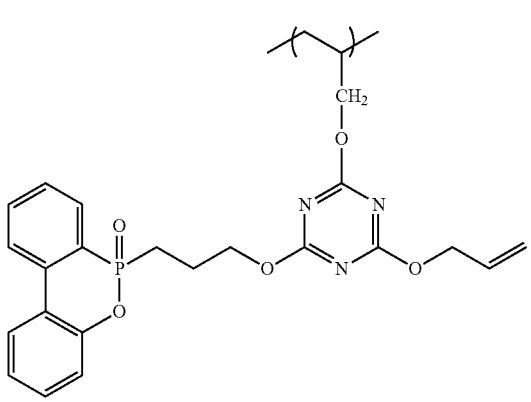
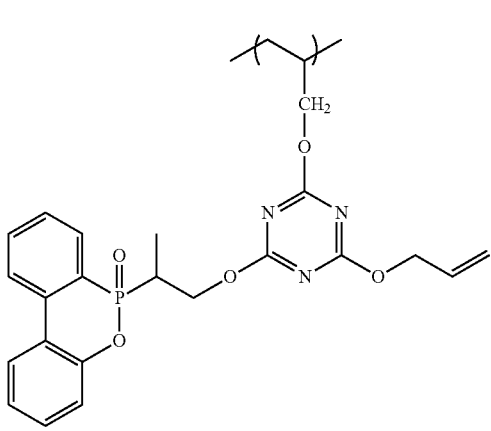
[Formula 5]
Structural formulae (5)
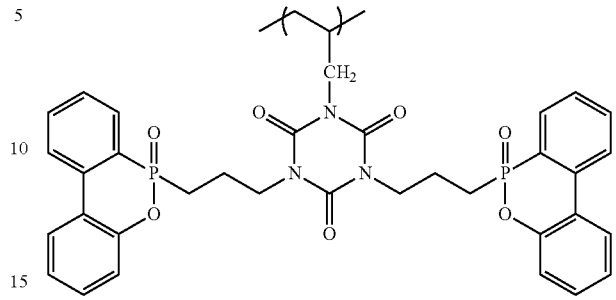
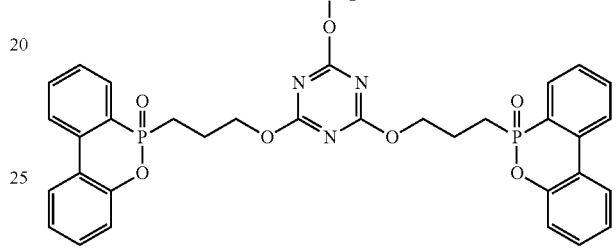
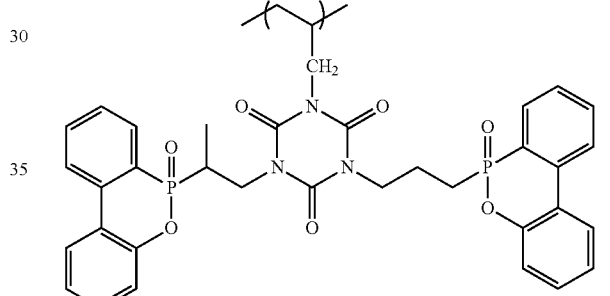
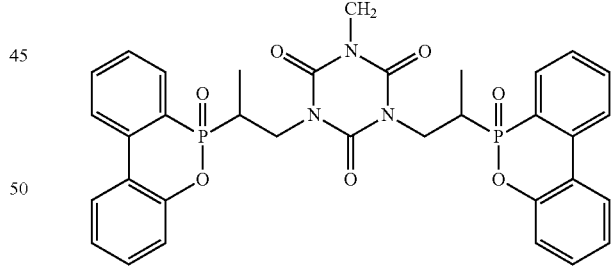
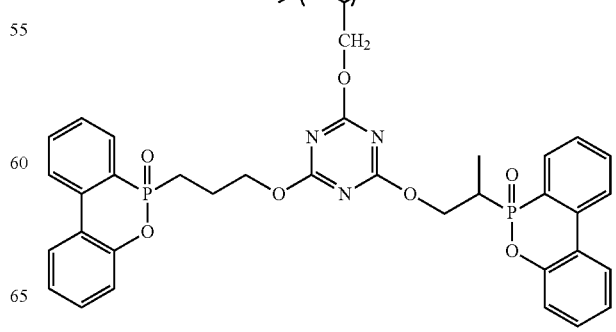

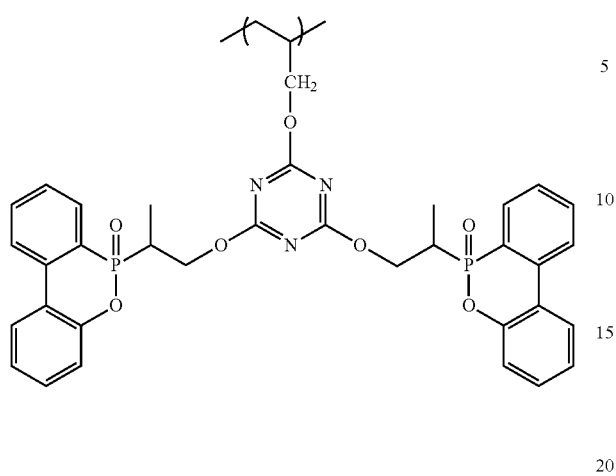

The present invention relates to the flame retardant, wherein a content of the crosslinked component in the flame retardant is 1 wt % or more.

Such a crosslinked component content leads to further improvement of heat resistance and improvement in heat resistance of the composition on reflow process.

The present invention also relates to a flame retardant for thermoplastic resins, comprising a polymer having the first to third repeating units respectively represented by structural formulae (3) to (5), wherein the a flame retardant is insoluble in toluene, a content of a crosslinked component insoluble in chloroform is 1 wt % or more, and a phosphorus atom content in the flame retardant is 5 to 10 wt %.

[Formula 6]

Structural formulae (3)

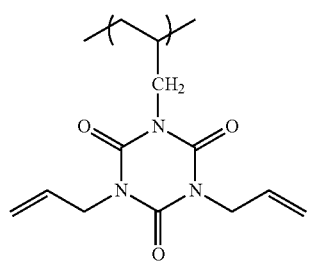

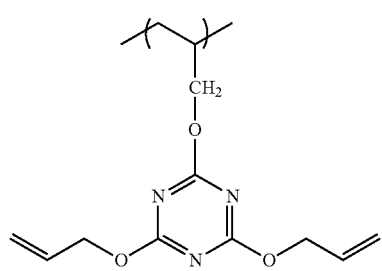

[Formula 7]

Structural formulae (4)

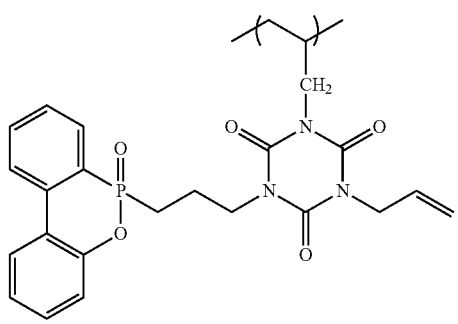

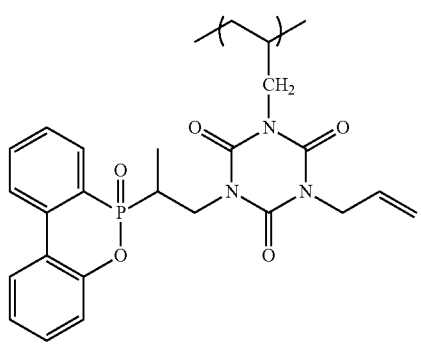

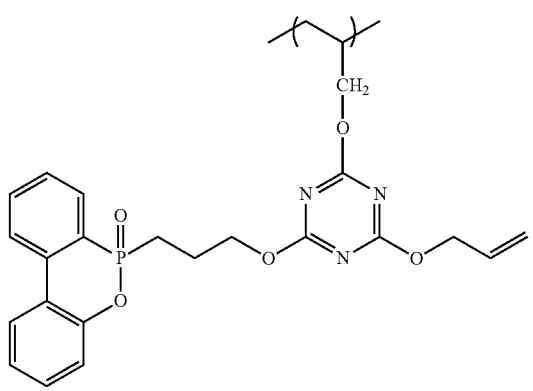

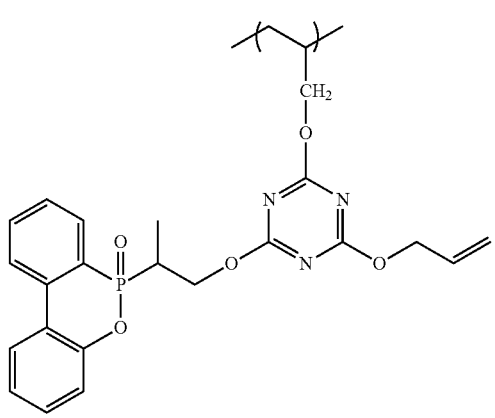

9
-continued
[Formula 8]
Structural formulae (5)
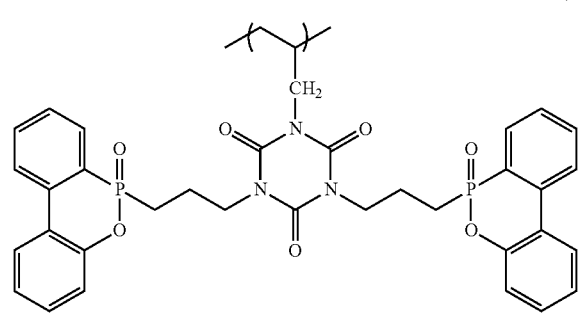
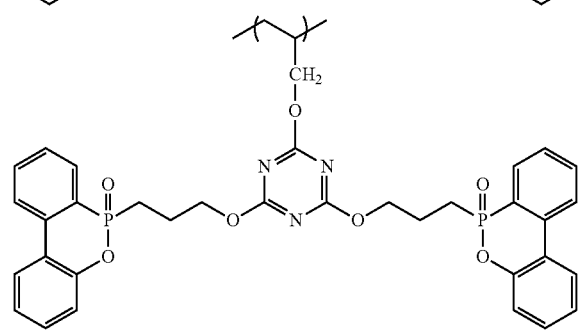
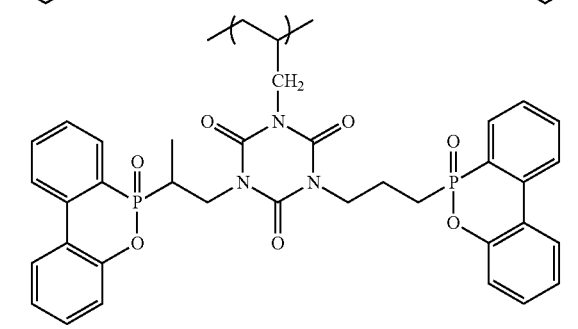
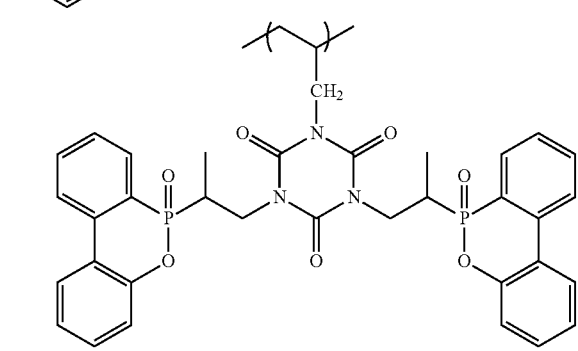
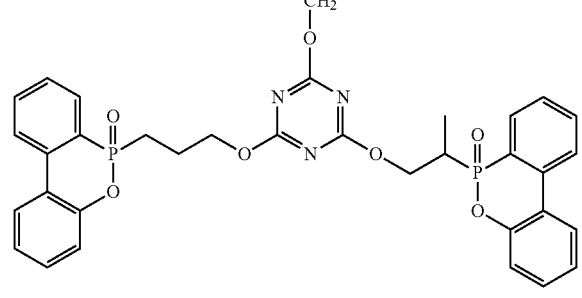
10
-continued
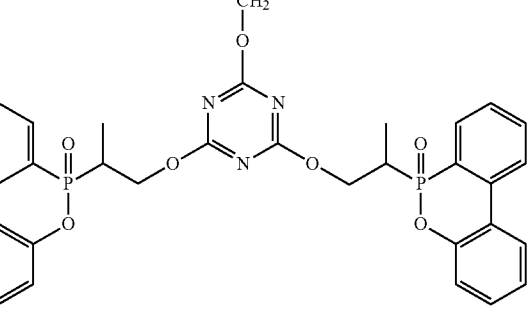
[Formula 9]
Structural formulae (6)
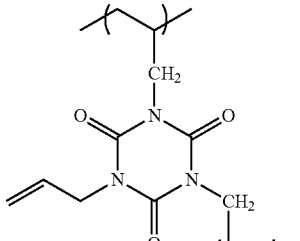
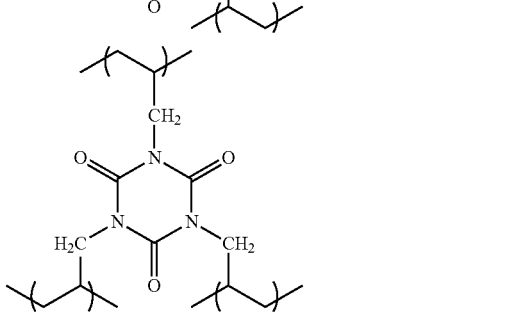
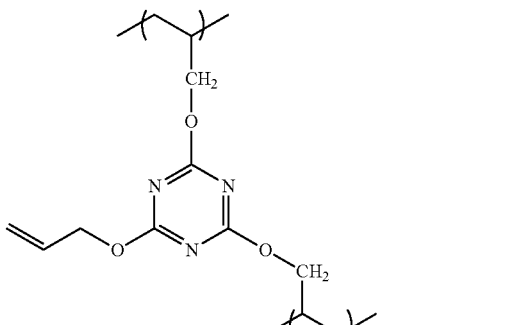
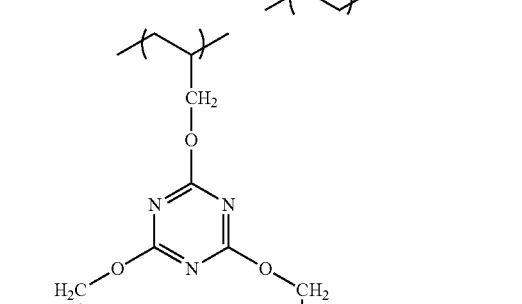

-continued

[Formula 10]

Structural formulae (7)

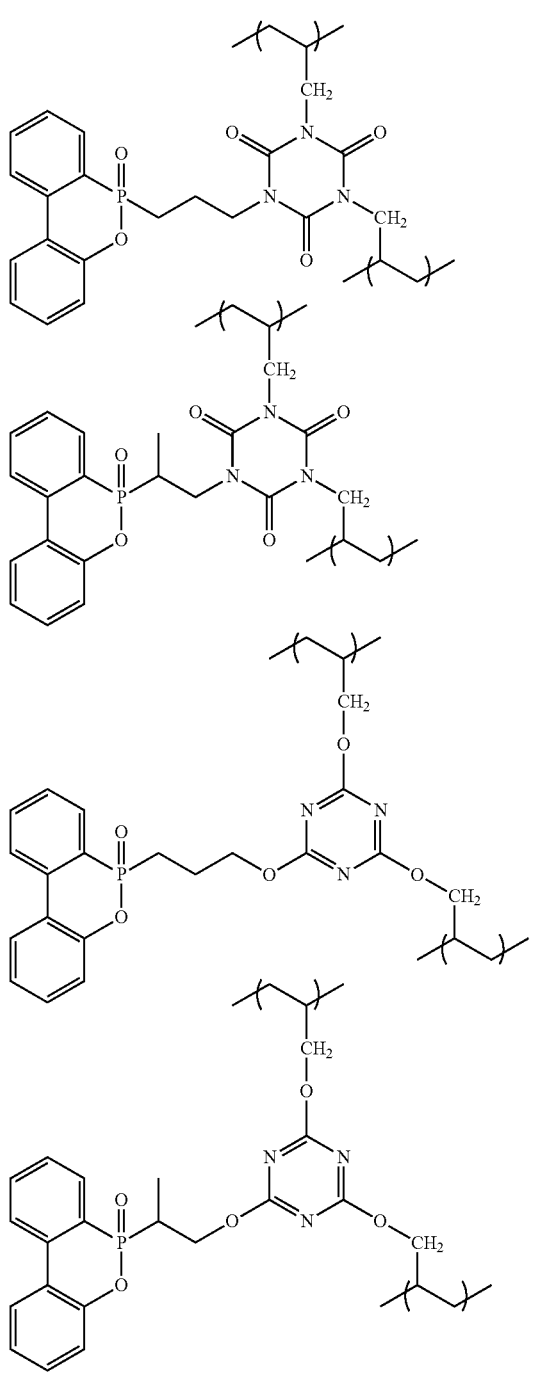

The present invention also relates to a flame-retardant thermoplastic resin composition, comprising 0.1 to 75 wt parts of the flame retardant of the present invention and 100 wt parts of a thermoplastic resin.

In a favorable embodiment, it is the flame-retardant thermoplastic resin composition, wherein the thermoplastic resin is one or more resins selected from the group consisting of polyethylene terephthalate resins, polybutylene terephthalate resins, aliphatic polyamide resins, semi-aromatic polyamide resins, polycarbonate resins, and modified polyphenyleneoxide-based resins.

The present invention also relates to a method of producing the flame retardant of the present invention, comprising a step of reacting the phosphorus-containing compound with the nitrogen-containing compound, and polymerizing the nitrogen-containing compound and the nitrogen-containing compound bonded with the phosphorus-containing compounds, by heating a mixture containing a nitrogen-containing compound and a phosphorus-containing compound at a molar ratio of 1:1.0 to 2.5 to 180-240° C. at a heating rate of 1-100° C./hour under nitrogen atmosphere.

The present invention is a method of producing a flame retardant, comprising a step of heating the mixture containing the particular raw materials at the particular molar ratio at the particular heating rate to the particular temperature, as described above, and it is thus possible to raise the content of the phosphorus/nitrogen-containing compound in the flame retardant of the present invention. Therefore, it is a production method for a flame retardant, having further advantageous effects of the present invention.

The present invention also relates to a method of producing the flame retardant of the present invention, comprising a step of adding the phosphorus-containing compound to the nitrogen-containing compound and the polymerized nitrogen-containing compound while polymerizing the nitrogen-containing compound, and a crosslinking step of reacting unreacted unsaturated bond-containing groups with each other directly or by using a crosslinking agent, by heating a mixture containing a nitrogen-containing compound and a phosphorus-containing compound at a molar ratio of 1:1.0 to 2.5 to 180-240° C. at a heating rate of 1° C.-100° C./hour under nitrogen atmosphere.

Thus, the production method for a flame retardant of the present invention, which includes particularly a crosslinking step, gives a flame retardant further improved in heat resistance, especially in heat resistance at a processing temperature of 300° C. or higher and the resin compositions obtained by using the flame retardant are superior in heat resistance on reflow process.

In a favorable embodiment, it is a production method for the flame retardant, wherein the crosslinking step includes a way using an extruder or batch kneader.

Advantageous Effects of Invention

The flame retardant for thermoplastic resins of the present invention has high flame retardancy and is resistant to bleed out. Thus, thermoplastic resin compositions containing the flame retardant are superior in moldability and the moldings show smaller deterioration in physical properties and also in chemical resistance after moist-heat resistance test.

In addition, the flame retardant for thermoplastic resins of the present invention has high flame retardancy and is tolerant to a processing temperature of 300° C. or higher. Thus, the thermoplastic resin composition containing the flame retardant is superior in heat resistance on reflow process and gives moldings superior in chemical resistance.

BRIEF DESCRIPTION OF DRAWING

FIG. 1 is a graph showing the temperature profile in accordance with the JEDEC Standards used in the heat-resistance test on reflow process of Example.

DESCRIPTION OF EMBODIMENTS (Flame Retardant)

The flame retardant of the present invention is a flame retardant for thermoplastic resins, comprising a reaction product of a nitrogen-containing compound represented by one of structural formulae (1) and a phosphorus-containing compound represented by structural formula (2).

Such a flame retardant of the present invention should have a phosphorus atom content of 5 to 10 wt %, more preferably 6 to 9.5 wt %, more preferably 7 to 9 wt %, from the viewpoint of its flame retardancy.

For example, when triallyl isocyanurate used as the nitrogen-containing compound represented by one of the structural formulae (1) is reacted with 9,10-dihydro-9-oxa-10-phosphaphenanthrene-10-oxide (DOPO) used as the phosphorus-containing compound represented by the structural formula (2) at a nitrogen-containing compound: phosphorus-containing compound molar ratio of 1:1, the phosphorus atom content of the product is theoretically is 6.7%, and it is 9.1% in the case when the ratio is 1:2, and 9.8% in the case when the ratio is 1:2.5.

The flame retardant of the present invention is insoluble in toluene. Thus, the chemical resistance is further improved. It is preferable that it is insoluble also in tetrahydrofuran (THF). Thus, the chemical resistance is further improved. In the present invention, the phrase "insoluble in toluene" means that 80% or more of the sample remains undissolved based on the initial amount of the sample, when the solubility is examined by the test method (<Chemical resistance>) described below.

In addition, the flame retardant of the present invention preferably has a weight-average molecular weight (Mw) of 2,000 to 10,000, and more preferably 3,000 to 7,000, depending on the polymer structure, for sufficient expression of the advantageous effects of the present invention described above.

Further for expression of further advantageous effects of the present invention described above, when the weight-average molecular weight is in the particular range above, the flame retardant of the present invention, preferably has a ratio (Mw/Mn) of the weight-average molecular weight (Mw) to the number-average molecular weight (Mn) at 1 to 1.5, and more preferably 1 to 1.3.

The flame retardant of the present invention preferably has a content of the crosslinked component, i.e., solvent (chloroform)-insoluble component, in the flame retardant at 1 wt % or more, more preferably 10 wt % or more, and still more preferably 15 wt % or more. It is possible in this way to improve the heat resistance further and the heat resistance on reflow process of the resin composition further, compared to the case when the crosslinked component content is not in the particular range above. In addition, the flame retardant at such a crosslinked component content has larger molecular weight (possibly converted to macromolecule) than flame retardants without it, and is improved apparently in hydrolysis resistance because of crosslinking. For that reason, it is considered to be resistant to bleed out.

The term "crosslinked component," as used in the present invention, means a component having a crosslinked structure present in the reaction product, which is insoluble in chloroform. The content of the crosslinked component is to be determined in accordance with the measuring method described below.

The flame retardant of the present invention may contain polymers in various structure prepared by the production method described below. The polymer can be prepared, for example, by radical polymerization of ally groups in triallyl isocyanurate or the derivative thereof. Its typical example will be described below.

When triallyl isocyanurate 17-1 and triallyl cyanurate 17-2 are used as the nitrogen-containing compound and 9,10-dihydro-9-oxa-10-phosphaphenanthrene-10-oxide (DOPO) as the phosphorus-containing compound, monomer equivalents represented by structural formulae (8) would be formed in addition to the triallyl isocyanurate and the triallyl cyanurate.

[Formula 11]

Structural formulae (8)

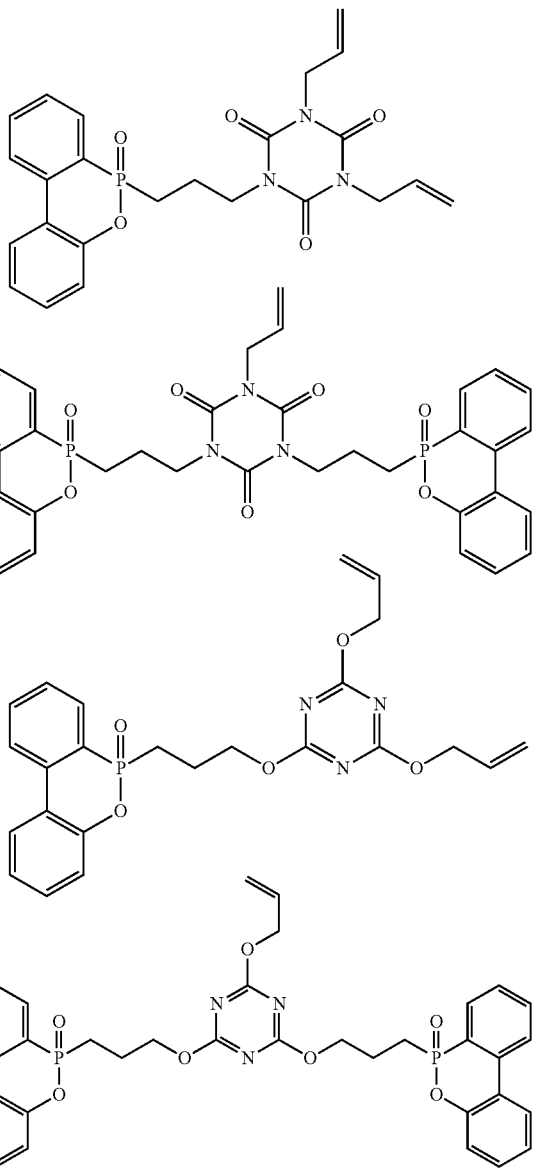

Depending on the method of adding DOPO to triallyl isocyanurate and triallyl cyanurate, isomers represented by structural formulae (9) may also be formed.

[Formula 12]

Structural formulae (9)

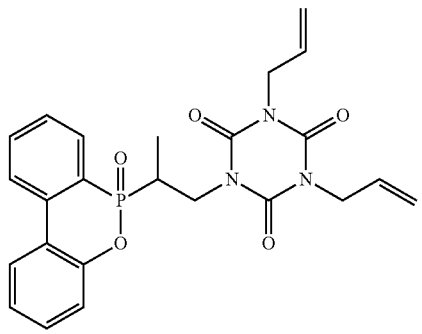

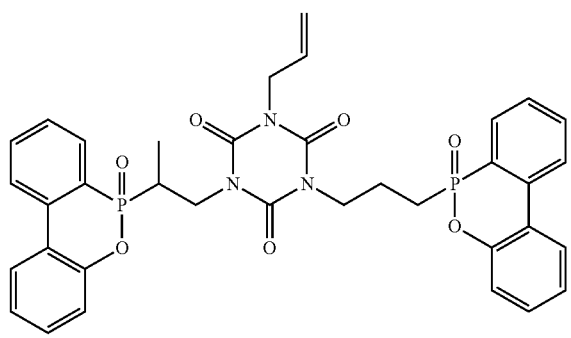

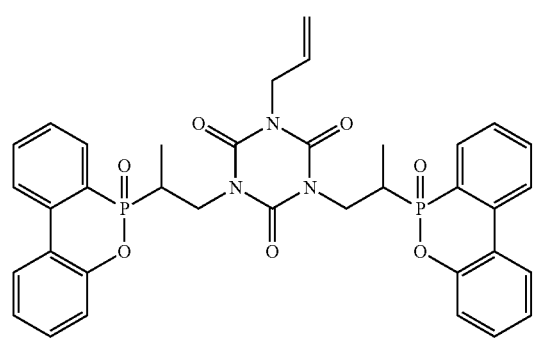

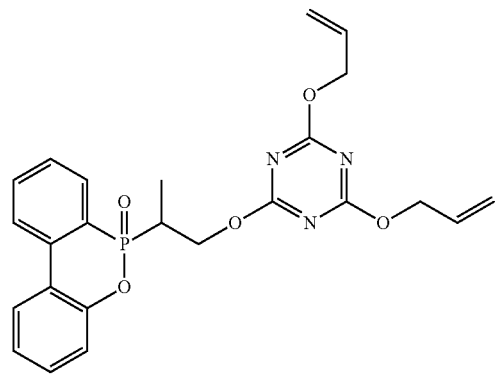

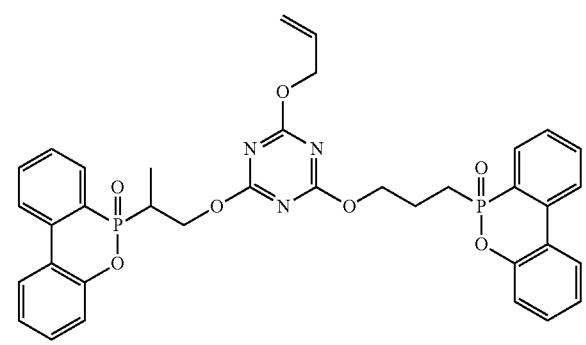

A first example of the flame retardant of the present invention is, for example, a flame retardant containing a polymer having at least one repeating unit selected from the group consisting of the first to third repeating units represented by the structural formulae (3) to (5), prepared by polymerization of the monomers and the equivalents thereof and one or more of the monomer isomers. The polymer structure is, for example, that represented by the following chemical formula (10), wherein the units are bound to each other randomly to form a polymer (copolymer, random copolymer).

[Formula 13]

Chemical formula (10)

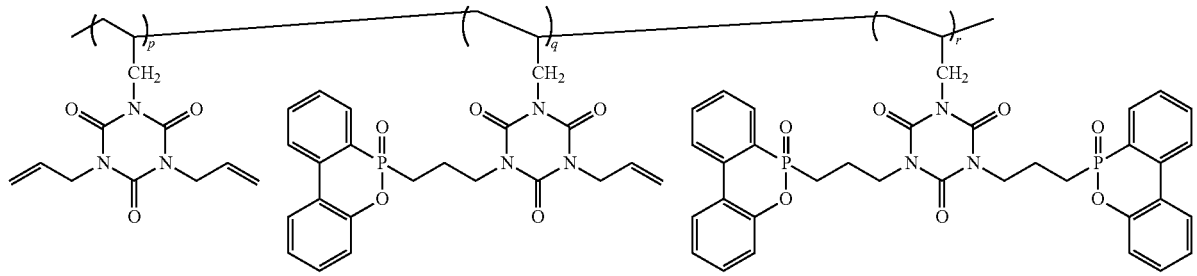

Although all bonds are shown in the head-to-tail configuration in the chemical formula (10) above, head-to-head bonds, as shown in structural formulae (11), may be formed, as in common polymerization reactions of allyl compounds.

[Formula 14]

Structural formulae (11)

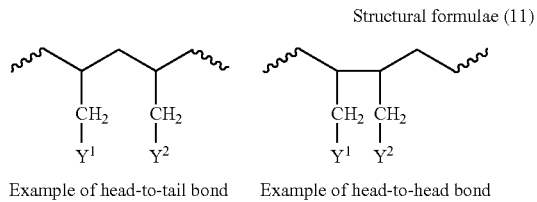

Example of head-to-tail bond     Example of head-to-head bond

In the structural formulae (11), $Y^1$ and $Y^2$ are any residues corresponding to those in chemical formula (10).

The flame retardant having the polymer structure above has a phosphorus atom content of 5 to 10 wt % and a weight-average molecular weight (Mw) of 2,000 to 10,000. Thus, for example in the case of the polymer structure represented by chemical formula (10), p, q, and r in chemical formula (10) are as follows, if the chain-transfer reaction described below is not taken into consideration. Specifically when the molecular weights of respective units are designated as $M_p$, $M_q$ and $M_r$, it is calculated approximately in accordance with the following Formula:

$$2000 \leq p \times M_p + q \times M_q + r \times M_r \leq 1000$$

$$(q+2r) \times (\text{atomic weight of phosphorus})/(p \times M_p + q \times M_q + r \times M_r) \geq 0.05$$

For example, in the case of the polymer represented by chemical formula (10), it is calculated approximately in accordance with the following Formulae:

$$p + 1.87q + 2.73r \geq 8.02$$

$$p + 1.87q + 2.73r \leq 40.11$$

$$(q+2r)/(p+q+r) \geq 0.62$$

If the polymer consists only of the units above, p can be approximately 8 to 41; q can be 4 to 22; and r can be 2 to 15, from the viewpoint of the molecular weight of the polymer (flame retardant). However, the polymer containing the units arbitrarily may not contain one of the units, and if such a case is considered, p can be 0 to 41; q can be 0 to 22; and r can be 0 to 15. When the phosphorus atom content is taken into consideration, q and r are not 0 simultaneously.

Also from the viewpoint phosphorus atom content, when the molar ratio of the first repeating unit is designated as P(P=p/(p+q+r)), the molar ratio of the second repeating unit as Q (Q=q/(p+q+r)), and the molar ratio of the third repeating unit as R(R=r/(p+q+r)), p, q, and r are selected so that Q+2R is 0.62 or more, more preferably 0.82 or more, still more preferably 1.12 or more, yet still more preferably 1.46 or more, most preferably 1.96 or more.

When a nitrogen-containing compound represented by one of structural formulae (1) and the phosphorus-containing compound represented by structural formula (2) are reacted to each other, as will be described below, unsaturated bond-containing groups such as allyl group may be radically polymerized, and the polymer may have a terminal similar to that obtained in common radical polymerization. In the case of radical polymerization, it is generally considered that the start terminal is the residue of a polymerization initiator (e.g., azobisisobutylonitrile (AIBN)), a chain-transfer agent (e.g., DOPO), or a chain-transferred product (e.g., chain-transferred solvent molecule), while the end terminal is the residue formed by disproportionation (abstraction of hydrogen from the radical terminal, forming double bond once again), recombination (bonding to other radical group, leading to termination of polymerization), or hydrogen abstraction (abstraction of hydrogen for example from other polymer, chain-transfer agent (such as DOPO) or solvent molecule).

As for the chain-transfer agents above, sulfur-based compounds are commonly used as the chain-transfer agents, because thio radical is relatively stable and yet has sufficient activity for reaction with a monomer, initiating polymerization reaction. In the present invention, it is considered that the P—H bond in the phosphorus-containing compound represented by structural formula (2) forms a radical easily by abstraction of the hydrogen and has chain-transferring potential.

When the chain-transfer reaction is considered, p, q, and r in chemical formula (10) can be expressed as follows. Specifically, when the molecular weights of respective units are designated as $M_p$, $M_q$, and $M_r$ and the molecular weight of the DOPO residue as $M_z$, it can be calculated approximately in accordance with the following formulae. The following Formula is a relationship when the start terminal is a DOPO residue and the end terminal is H (abstracted from DOPO).

$$2000 \leq p \times M_p + q \times M_q + r \times M_r + M_z \leq 10000$$

$$(q+2r+1) \times (\text{atomic weight of phosphorus})/(p \times M_p + q \times M_q + r \times M_r + M_z) \geq 0.05$$

For example in the case of the polymer represented by chemical formula (10), when both terminals are considered, it is defined approximately by the following Formula:

$$p + 1.87q + 2.73r \geq 7.16$$

$$p + 1.87q + 2.73r \leq 39.25$$

$$(q+2r)/(p+q+r) \geq 0.42$$

From the viewpoint of the molecular weight of the polymer (flame retardant), when the polymer consists only of the units above, p can be approximately 7 to 40; q can be 4 to 22; and r can be 3 to 15. However, the polymer may not contain any one of the units above and, if such a case is taken into consideration, p can be 0 to 40; q can be 0 to 22; and r can be 0 to 15. When the phosphorus atom content is taken into consideration, q and 1' are not 0 simultaneously.

From the viewpoint of phosphorus atom content, p, q, and r are determined so that Q+2R become preferably 0.42 or more, more preferably 0.61 or more, still more preferably 0.86 or more, yet still more preferably 1.18 or more, and most preferably 1.62 or more, similarly to above.

The chemical formula (10) used in the relationship above is an example when triallyl isocyanurate 17-1 and DOPO are used, but it also applies to the cases when triallyl cyanurate 17-2 and DOPO are used and when both triallyl isocyanurate 17-1 and triallyl cyanurate 17-2 are used.

In the present invention, at least one of the relationships of p, q, and r in the case when the chain-transfer reaction is not considered and in the case when it is considered will be satisfied.

A more typical example of the flame retardants of the present invention is the polymer represented by structural formula (12). It is a polymer having one of the third repeating units represented by the structural formulae (5) (p=q=0 and r=n in chemical formula (10)).

[Formula 15]

Structural formula (12)

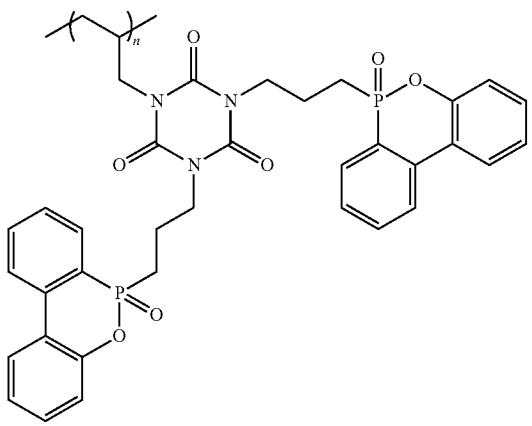

Another example is a polymer having the isomers represented by the following structural formulae (13), in addition to the polymer of the structural formula (12).

[Formula 16]

Structural formulae (13)

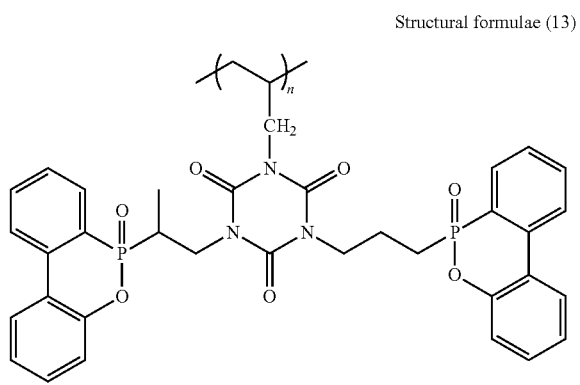

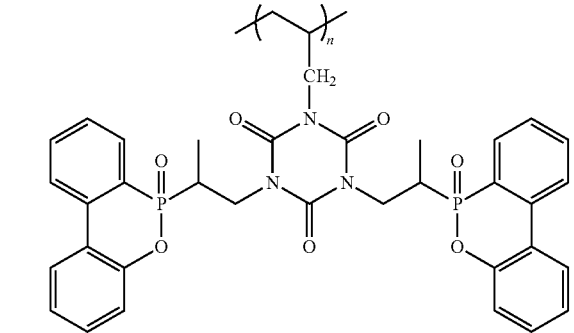

The phosphorus/nitrogen-containing compounds represented by the structural formulae (12) and (13) are linear polymers of a nitrogen-containing compound represented by one of structural formulae (1) that is bound to two molecules of the phosphorus-containing compound represented by structural formula (2).

The flame retardant of the present invention is considered to have, for example, a structure in which 3 to 14 pieces of a phosphorus/nitrogen-containing unit of a nitrogen-containing compound bound to two phosphorus-containing compounds are polymerized as the phosphorus/nitrogen-containing compound into straight chain. In such a case, the phosphorus/nitrogen-containing compound is likely to show very high flame-retardancy, as it has a high phosphorus atom content of 8.7 wt % and a high nitrogen atom content of 5.9 wt %, show excellent moldability, as it is dispersed in the resin matrix in the isolated island shape when added to a thermoplastic resin, and give a molding superior in bleed-out resistance and chemical resistance.

A second example is a flame retardant containing a polymer having the first to third repeating units represented respectively by the structural formulae (3) to (5) and containing a crosslinked component having the crosslinked structures represented by the structural formulae (6) and (7) at a particular rate. The polymer in the present example contains a crosslinked structure in which multiple polymers represented by the chemical formula (10) are bound to each other via the double bonds of the allyl groups.

In this example, the flame retardant containing the polymer has a phosphorus atom content of 5 to 10 wt %. When the molar ratio of the total amount of the first repeating unit represented by structural formula (3) and the components having a crosslinked structure represented by structural formulae (6) is designated as P', the molar ratio of the total amount of the second repeating units represented by the structural formulae (4) and the components having crosslinked structure represented by structural formulae (7) is designated as Q', and the molar ratio of the third repeating units represented by structural formulae (5) is designated as R', Q'+2R' is 0.62 or more, more preferably 0.82 or more, still more preferably 1.12 or more, yet still more preferably 1.46 or more, and most preferably 1.96 or more. Here, P'+Q'+R'=1.

Examples of other polymers having a crosslinked structure include polymers having the first to third repeating units represented by structural formulae (3) to (5) and additionally the crosslinked components having a crosslinked structure represented by structural formulae (14). The polymers in the present example are those in which, for example, multiple polymers represented by the chemical formula (10) are bound to each other via triallyl isocyanurate, as crosslinking agent, or other crosslinking agent.

[Formula 17]

Structural formulae (14)

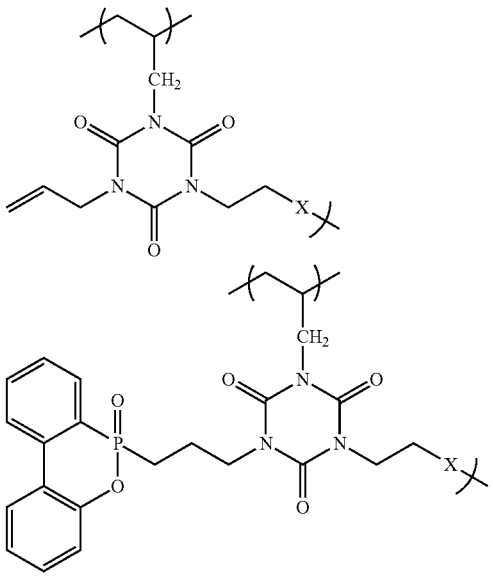

(in structural formula (14), X represents a triallyl isocyanurate residue or a crosslinking agent residue).

The crosslinking agent for use may be a common bifunctional monomer used in normal radical polymerization. Examples thereof include non-methacrylic polyfunctional vinyl monomers such as divinylbenzene, polyfunctional methacrylate monomers such as ethylene glycol dimethacrylate, diethylene glycol dimethacrylate, polyethylene glycol dimethacrylate, trimethylolpropane trimethacrylate, and allyl methacrylate and the like. Alternatively, one or more of these crosslinking agents may be used in combination.

The flame retardant in the present example is prepared by the production method of the present invention comprising a crosslinking step described below. For example, it is possible to obtain a phosphorus/nitrogen-containing compound having a crosslinked structure by reacting triallyl isocyanurate and DOPO with each other by using them at a molar ratio (T/H) of 1/2 or more, or by using reaction between unreacted allyl groups or by using a crosslinking agent even when it is less than 1/2. In this case, the flame retardant having a crosslinked structure is more thermally stabilized than non-crosslinked flame retardant. It has heat resistance as it is and it is thermally stable also as it is blended with a thermoplastic resin; it gives a blended resin, for example with nylon 46, nylon 9T, or nylon 6T, that shows consistent heat resistance on reflow process when used in application for lead-free SMT-compatible connectors. In addition, flame retardants containing such a crosslinked component are considered to be larger in molecular weight (possibly converted to macromolecule) than flame retardants without it, to have apparent hydrolysis resistance improved by crosslinking and to be resistant to bleed out.

The term reflow, as used herein, means a production method (step) of soldering an electronic part by connecting it onto a cream solder coated on a substrate and heating the entire substrate to a temperature higher than the solder melting point in a high-temperature oven. The heat resistance on reflow process is a property, in the case of a resin molding, of withstanding the temperature of the reflow process without fusion, deformation or blistering.

The flame retardant of the present invention does not need to have the structure of the structural formula (12) entirely as the backbone structure of flame retardant, if the advantageous effects of the present invention is obtained sufficiently, and, may contain partially, for example, the structure represented by structural formula (15) or (16), in which three molecules of a phosphorus-containing compound are connected to a nitrogen-containing compound.

[Formula 18]

Structural formulae (15)

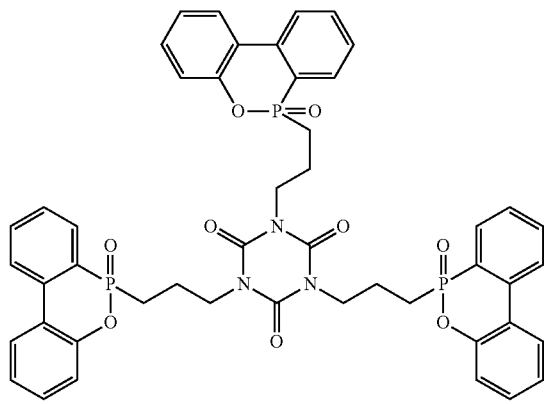

-continued

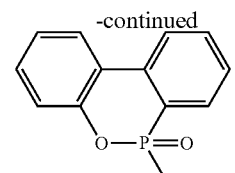

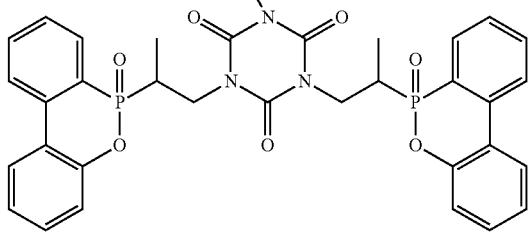

[Formula 19]

Structural formulae (16)

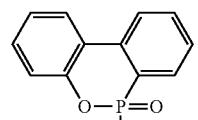

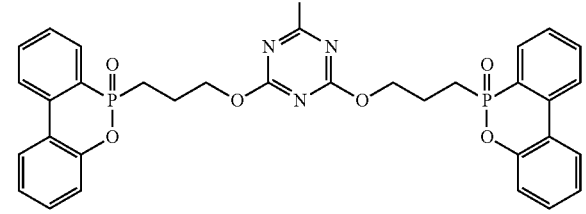

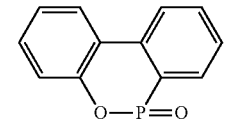

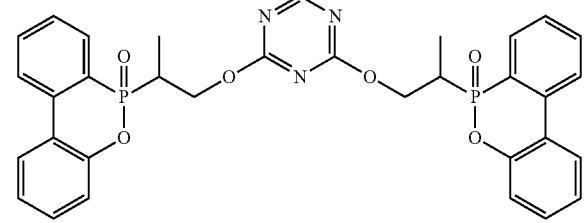

(Nitrogen-Containing Compound)

As described above, the nitrogen-containing compound is represented by the structural formulae (1). The unsaturated bond-containing groups in the structural formulae (1) include methacryloyloxyethyl, vinylphenyl, vinylbenzyl, vinyl, allyl and the like. Nitrogen-containing compounds containing these unsaturated bond-containing group include tris(methacryloyloxyethyl) isocyanurate, tris(vinylphenyl) isocyanurate, tris(vinylbenzyl) isocyanurate, trivinyl isocyanurate, triallyl isocyanurate, triallyl cyanurate and the like. It is preferably one or more compounds selected from triallyl isocyanurate 17-1 and triallyl cyanurate 17-2 represented by structural formulae (17), and more preferably triallyl isocyanurate from the viewpoints of easiness of increasing phosphorus content in the reaction product and also availability.

[Formula 20]

Structural formulae (17)

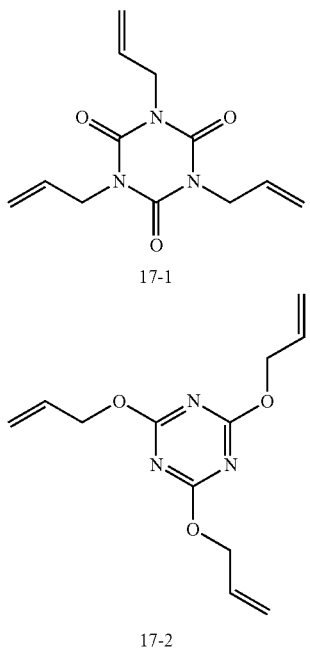

17-1

17-2

(Phosphorus-Containing Compound)

The phosphorus-containing compound is represented by the structural formula (2), as described above. Typical examples of the compounds include 9,10-dihydro-9-oxa-10-phosphaphenanthrene-10-oxide (DOPO), 8-methyl-9,10-dihydro-9-oxa-10-phosphaphenanthrene-10-oxide, 2,6,8-tri-t-butyl-9,10-dihydro-9-oxa-10-phosphaphenanthrene-10-oxide, 6,8-dicyclohexyl-9,10-dihydro-9-oxa-10-phosphaphenanthrene-10-oxide and the like. It is preferably DOPO from the viewpoints of high phosphorus content and availability.

(Thermoplastic Resin Composition)

The flame-retardant thermoplastic resin composition of the present invention should contain the flame retardant of the present invention in an amount of 0.1 to 75 wt parts and a thermoplastic resin in an amount of 100 wt parts. For obtaining sufficient flame retardancy, for favorable processability, and for preservation of the mechanical strength of the moldings, the flame retardant of the present invention is contained more preferably in an amount of 1 wt part or more, still more preferably 3 wt parts or more, particularly preferably 5 wt parts, and more preferably 70 wt parts or less, still more preferably 65 wt parts or less with respect to 100 wt parts of the thermoplastic resin.

Examples of the thermoplastic resins include polyester resins such as polyethylene terephthalate resins and polybutylene terephthalate resins; aliphatic polyamide resins such as nylon 6, nylon 66, and nylon 46; semi-aromatic polyamide resins such as modified nylon 6T and nylon 9T; polycarbonate resins, modified polyphenylene oxide resins, polyphenylene sulfide resins, polyacetal resins, polyolefin resins, polystyrene resins, ABS resins, polyacrylic resins and the like.

In particular, since favorable bleed-out resistance during use at high temperature and under humid heat, favorable heat resistance at a processing temperature of 300° C. or higher, prevention of deterioration in heat resistance on reflow process and mechanical strength, which are the advantageous effects of the flame retardant of the present invention, are demanded and these advantageous effects are obtained sufficiently, it is preferably one or more resins selected from polyethylene terephthalate resins, polybutylene terephthalate resins, aliphatic polyamide resins, semi-aromatic polyamide resins, polycarbonate resins, and modified polyphenyleneoxide-based resins. It is more preferably one or more resins selected from the group consisting of polyethylene terephthalate resins, polybutylene terephthalate, polycarbonate resins, modified nylon GT, and nylon 9T.

An inorganic filler may be added to the resin composition according to the present invention, as needed, for improvement in strength, rigidity, heat resistance and others. The inorganic filler is not particularly limited, if it is a fibrous and/or particulate inorganic filler, and two or more of them may be used in combination.

Typical examples of the inorganic fillers for use in the present invention include glass fibers, carbon fibers, metal fibers, aramide fibers, asbestos, potassium titanate whisker, wollastonite, glass flakes, glass beads, talc, mica, clay, calcium carbonate, barium sulfate, titanium oxide, aluminum oxide and the like.

A known glass fiber normally commonly used may be used as the glass fiber for use in the present invention, but use of chopped strand glass fiber treated with a sizing agent is preferable from the viewpoint of processability.

The glass fiber for use in the present invention is preferably a glass fiber treated with a coupling agent on the surface for improvement in adhesiveness between the resin and the glass fiber. It may be a glass fiber containing a binder. Favorable examples of the coupling agents include alkoxysilane compounds such as γ-aminopropyltriethoxysilane and γ-glycidoxypropyltrimethoxysilane, and favorable examples of the binders for use include epoxy resins, urethane resins and the like, but are not limited thereto.

The content of the inorganic filler in the present invention is preferably at least 5 wt parts, more preferably at least 10 wt parts, still more preferably at least 15 wt parts with respect to 100 wt parts of the thermoplastic polyester. When the inorganic filler content is less than the lower limit value of 5 wt parts, improvement in heat resistance and rigidity may be insufficient. The maximum value of the inorganic filler content is preferably 120 wt parts, more preferably 100 wt parts, and still more preferably 80 wt parts. An inorganic filler content of more than the maximum value of 120 wt parts may lead to deterioration in flowability, deterioration in moldability of thin moldings, and also deterioration of the surface smoothness of the moldings obtained.

The resin composition of the present invention may contain, as needed, additives such as drip inhibitors, pigments, heat stabilizers, antioxidants, and lubricants.

The present invention also relates to the following fire-retardant resin composition: a fire-retardant resin composition, comprising 0.1 to 75 wt parts of a flame retardant containing the reaction product of a nitrogen-containing compound represented by structural formulae (1) and a phosphorus-containing compound represented by the structural formula (2) and having a phosphorus atom content of 5 to 10 wt %, and 100 wt parts of a resin. The flame retardant may be soluble or insoluble in toluene. The kinds and the contents of the components in the fire-retardant resin composition are the same as those explained above for the flame-retardant thermoplastic resin composition.

(Production Method for Flame Retardant)

A first favorable production method for the flame retardant of the present invention comprises a step of adding the phosphorus-containing compound to the nitrogen-containing compound and the polymerized nitrogen-containing compound while polymerizing the nitrogen-containing compound, by heating a mixture containing a nitrogen-containing compound and a phosphorus-containing compound at a molar ratio of 1:1.0 to 2.5 to 180-240° C. at a heating rate of 1° C.-100° C./hour under nitrogen atmosphere.

A radical initiator (polymerization initiator) may be added, as needed, in the step for acceleration of the addition or polymerization reaction and improvement of productivity. Addition of the radical initiator may also be effective for preparation of a flame retardant having a weight-average molecular weight in a particular range. However, for example for preparation of the flame retardant in the polymer structure represented by chemical formula (10) above, the addition amount thereof is preferably low for suppression of the crosslinking reaction as much as possible.

A second favorable production method for the flame retardant of the present invention comprises a step (1) of adding the phosphorus-containing compound to the nitrogen-containing compound and the polymerized nitrogen-containing compound while polymerizing the nitrogen-containing compound, and a crosslinking step (2) of reacting the unsaturated bond-containing groups such as unreacted allyl groups in the reaction precursor obtained in step (1) with each other directly or by using a crosslinking agent, by heating a mixture containing a nitrogen-containing compound and a phosphorus-containing compound at a molar ratio of 1:1.0 to 2.5 to 180-240° C. at a heating rate of 1° C.-100° C./hour under nitrogen atmosphere. The steps (1) and (2) may be carried out continuously.

For example, in a typical example of the step (2), the reaction among the unsaturated bond-containing groups such as allyl groups is promoted, as the polymerization period in step (1) is elongated; the unsaturated bond-containing groups are crosslinked by addition of a crosslinking agent; or the precursors obtained in step (1) are allowed to react by using a horizontal reactor such as extruder or a batch resin kneader such as kneader, Banbury mixer, two-roll or plastmill and additionally by addition of a radical initiator (polymerization initiator) or a crosslinking agent.

When a radical initiator is added in the second production method, the addition amount thereof is preferably 0.01 to 5 parts, more preferably, 0.05 to 1 part, with respect to 100 parts of the total amount of the nitrogen- and the phosphorus-containing compounds or of the reaction precursor. An organic peroxide or an other known initiator is preferably selected as the radical initiator, as the polymerization reaction time is taken into consideration. Examples thereof include dialkyl peroxides such as 1,3-di(t-butylperoxyisopropyl)benzene, 2,3-dimethyl-2,3-diphenylbutane.

The second production method is particularly favorable for production of a flame retardant containing a crosslinked component at a particular rate.

In any one of the production methods above, the molar ratio in the present invention is preferably 1:1.5 to 1:2, for reduction of the unreacted phosphorus-containing compounds which may cause gas generation and bleed-out during molding, i.e., during extrusion, and for improvement of the purity of the phosphorus/nitrogen-containing compound in the flame retardant.

Because the reactions for obtaining the phosphorus/nitrogen-containing compound in the present invention include addition of the phosphorus-containing compound to the unsaturated bonds in the nitrogen-containing compound and addition polymerization of the unsaturated bonds in the nitrogen-containing compound, two or more of $R^1$, $R^2$, and $R^3$ in the structural formulae (1) should be unsaturated bond-containing groups and the other should be a hydrogen atom or an organic group other than unsaturated bond-containing groups, as described above.

Progress of the reaction can be monitored by collecting samples of the reaction product during reaction periodically and analyzing it by using $^1$H-NMR apparatus. The addition reaction in the reaction above occurs by addition of phosphorus in the phosphorus-containing compound to the C=C carbon unsaturated bonds of the nitrogen-containing compound, as described above, and thus, disappearance of the signals (8.80 and 7.08 ppm) of the P—H protons of the phosphorus-containing compound is observed on $^1$H-NMR. Since the addition polymerization reaction in the reaction above is polymerization reaction of nitrogen compounds with each other, i.e., addition polymerization of allyl groups similar to the polymerization reaction of normal unsaturated bonds, decrease of the integrated value of the proton signals of unsaturated bonds (5.23 ppm to 5.33 ppm and 5.83 ppm to 5.93 ppm) and appearance of proton signals of the C—C single bonds newly formed are observed.

Although examples wherein the unsaturated bond-containing group is an allyl group were described, the progress of the reaction can be monitored similarly depending on the kind of the unsaturated bond.

EXAMPLES

Hereinafter, the composition of the present invention will be described more specifically with reference to typical examples, but it should be understood that the present invention is not limited thereby.

Hereinafter, the resins and raw materials used in Examples and Comparative Examples will be shown.

[Phosphorus-Containing Compound (A1)]

9,10-dihydro-9-oxa-10-phosphaphenanthrene-10-oxide (product name: HCA, manufactured by SANKO CO., LTD) was used as a phosphorus-containing compound (A1) of the present invention.

[Phosphorus-Containing Compound (A2)]

The phosphorus-containing compound (A2) prepared by the preparative example 1 described below was used as a flame retardant of Comparative Example.

[Phosphorus-Containing Compound (A3)]

A condensed phosphate ester (product name: PX-200, manufactured by Daihachi Chemical Industry Co., Ltd.) was used as phosphorus-containing compound (A3) for a flame retardant of Comparative Example.

[Phosphorus-Containing Compound (A4)]

The phosphorus-containing compound (A4) prepared by the preparative example 7 described below was used as a flame retardant of Comparative Example.

[Phosphorus/Nitrogen-Containing Compounds (B1) to (B5)]

Phosphorus/nitrogen-containing compounds (B1) to (B5) respectively prepared by Preparative Examples 2 to 6 described below were used as the inventive flame retardants.

[Phosphorus/Nitrogen-Containing Compound (B6) to (B9)]

The phosphorus/nitrogen-containing compounds (B6) to (B9) respectively prepared by Preparative Examples 7 to 10 described below were used as inventive flame retardants.

[Nitrogen-Containing Compound (C1)]

Triallyl isocyanurate (product name: TAICROS, manufactured by Evonik Degussa) was used as an inventive nitrogen-containing compound (C1).

[Nitrogen-Containing Compound (C2)]

Triallyl cyanurate (product name: TAC, manufactured by Evonik Degussa) was uses as an inventive nitrogen-containing compound (C2).

[Resin (D1)]

A polyethylene terephthalate resin (product name: EFG-70, manufactured by Bell Polyester Products, Inc.) was used as an inventive thermoplastic resin (D1).

[Resin (D2)]

A polycarbonate resin (product name: Tarflon A2500, manufactured by Idemitsu Kosan Co., Ltd.) was used as an inventive thermoplastic resin (D2).

[Resin (D3)]

A nylon 9T resin (product name: Genestar N-1000A, manufactured by Kuraray Co., Ltd.), a semi-aromatic polyamide resin, was used as an inventive thermoplastic resin (D3).

[Resin (D4)]

A modified nylon 6T resin (product name: Amodel A-1006C, manufactured by Solvay Advanced Polymers, K.K), a semi-aromatic polyamide resin, was used as an inventive thermoplastic resin (D4).

[Inorganic Compound (E1)]

A glass fiber (product name: T-187H, manufactured by Nippon Electric Glass Co., Ltd.) was used as an inventive inorganic compound (E1).

[Inorganic Compound (E2)]

A glass fiber (product name: FT75GD, manufactured by Owens Corning) was used as an inventive inorganic compound (E2).

[Radical Initiator (F1)]

2,3-Dimethyl-2,3-diphenylbutane (product name: Nofiner BC, manufactured by NOF Corporation) was used as an inventive radical initiator (F1).

[Radical Initiator (F2)]

1,3-Di(t-butylperoxyisopropyl)benzene (product name: Perbutyl P, produce by NOF Corp.) was used as an inventive radical initiator (F2).

Evaluation methods used in Preparative Examples are as follows:

<Weight-Average Molecular Weight (Mw) and Mw/Mn>

Mw and Mw/Mn of the phosphorus/nitrogen-containing compound obtained were determined by GPC by using chloroform as the solvent, and the GPC measurement was performed by using polystyrene standards and a GPC apparatus (column: K-804 and K-802.5, manufactured by Showa Denko K.K.) at 35° C.

<Glass Transition Temperature (Tg)>

Tg of the phosphorus/nitrogen-containing compound obtained was determined by DSC, and the DSC analysis was performed by using DSC-220C manufactured by Seiko Instruments Inc. at a heating rate of 10° C./min under nitrogen stream.

<Phosphorus Content>

The phosphorus content of the phosphorus/nitrogen-containing compound obtained was determined by high-frequency plasma emission spectrophotometric analysis (ICP-AES). The ICP-AES was performed by decomposing the sample by microwave in ETHOS manufactured by Milestone in accordance with US EPA METHOD 3052 as pretreatment and analyzing the products by using ICPS-8100 manufactured by Shimadzu Corporation.

<Crosslinked Component Rate>

The phosphorus/nitrogen-containing compound obtained was crushed and the soluble component of the crushed product was extracted with chloroform in a Soxhlet extraction apparatus for 6 hours. The extraction residue was dried at 100° C. for 6 hours, the weight was measured, and the crosslinked component rate was calculated from the following calculation Formula:

[Crosslinked component rate (%)=[Weight of extraction residue]×100/[Weight of the phosphorus/nitrogen-containing compound initially supplied]

<Chemical Resistance>

5 mg of the phosphorus/nitrogen-containing compound obtained was dispersed in toluene (50 ml) or toluene and tetrahydrofuran (THF) (50 ml), left as it was at room temperature for 3 days, and the insoluble component was filtered and dried. The chemical resistance was evaluated by comparison of the weight thus determined with the initial weight.

A: Insoluble component content was 80% or more of the amount initially added.

B: Insoluble component content was less than 80% of the amount initially added.

Evaluation methods used in Examples are as follows.

<Flame Retardancy>

The pellets obtained in the following Examples were dried at 120° C. for 3 hours and injection-molded in an injection molding machine (JS36SS, clamp pressure: 35 tonnes) under the condition of a cylinder temperature setting of 250-280° C. and a mold temperature of 60° C., to give a test piece of 127 mm×12.7 mm×1/16 inch (thickness). The combustibility thereof was evaluated in accordance with the V test specified in UL94 Standards by using the obtained bar-shaped test piece having a thickness of 1/16 inch.

<Tensile Strength>

The pellets obtained were dried at 120° C. for 3 hours and then injection-molded in an injection molding machine (clamp pressure: 75 tonnes) under the condition of a cylinder temperature setting of 250-280° C. and a mold temperature of 120° C. A dumbbell-shaped test piece was prepared in accordance with ASTM D-638. The tensile strength of the test piece obtained was determined in accordance with ASTM D-638 at 23° C.

<Evaluation of Bleed-Out Resistance>

The dumbbell used in the tensile test was heated in an oven at 140° C. for 1 hour and absorbent cotton was pressed on the molding after heating, to examine whether there is deposition of the absorbent cotton on the molding.

A: There was no bleed-out of the phosphorus-containing compound and not deposition of the absorbent cotton.

B: There was bleed-out of the phosphorus-containing compound and deposition of the absorbent cotton on the molding.

<Evaluation of Bleed-Out Resistance after Moist-Heat Resistance Test>

The dumbbell used in the tensile test was subjected to a moist-heat resistance test in a pressure cooker (PC-422R5E, manufactured by Hirayama Manufacturing Corporation) under the condition of 120° C. and 100% RH for 20 hours, and then absorbent cotton was pressed to the molding and deposition thereof on the mold was examined.

A: There was no bleed-out and no deposition of absorbent cotton on the molding.

B; There was bleed-out and deposition of absorbent cotton on the molding.

<Evaluation of Physical Properties after Moist-Heat Resistance Test>

After the moist-heat resistance was evaluated under the same condition as the bleed-out evaluation, a tensile test was performed by the method identical with that for the tensile strength above and the difference in tensile strength between before and after the test was calculated.

<Heat Resistance on Reflow Process>

The pellets obtained in the following Example were dried at 120° C. for 3 hours and injection-molded in an injection molding machine (JS36SS, clamp pressure: 35 tonnes) under the condition of a cylinder temperature setting of 280-310° C. and a mold temperature of 140° C., to give a test piece of 127 mm×6.3 mm×1/32 inch (thickness). The test piece was dried at 125° C. for 24 hour, moisturized at level 2 (85° C.×60% RH×168 hours), as specified in IPC/JEDEC J-STD-020D.1, and placed on an alumina substrate having a thickness of 0.8 mm. A temperature sensor was additionally placed on the substrate and the profile was determined. A reflow test at the temperature profile shown in FIG. 1 was performed in accordance with JEDEC Standards by using an air/IR reflow apparatus (NRY-535 MB-7Z, manufactured by YAMATO WORKS Corporation), and the heat resistance on reflow process was evaluated in accordance with the following criteria:

A: There was no fusion, deformation or blistering in the test pieces used in the moisture-absorption test and absolutely dry test.

B: There was fusion, deformation or blistering only in the test piece used in the moisture-absorption test.

C: There was fusion, deformation or blistering both in the test pieces used in moisture-absorption test and absolutely dry test.

Preparative Example 1

A phosphorus-containing compound (A1), 60 wt parts (equimolar to (A1)) of itaconic acid, and 160 wt parts (two molars or more to itaconic acid) of ethylene glycol were placed in a vertical polymerization reactor equipped with a distillation column, a rectification column, a nitrogen-supplying tube, and a stirrer, and the mixture was heated gradually to 120-200° C. under nitrogen gas atmosphere and stirred approximately for 10 hours.

Antimony trioxide and zinc acetate each in an amount of 0.1 wt part were added thereto, and the mixture was kept at a temperature of 220° C. under a vacuum reduced pressure of less than 1 torr, allowing polycondensation reaction and distillation of ethylene glycol simultaneously. The reaction was considered complete approximately after 5 hours, when distillation of ethylene glycol subsided significantly. The properties of the phosphorus-containing compound (A2) obtained are shown in Table 1.

Preparative Examples 2 to 5

A phosphorus-containing compound and a nitrogen-containing compound were placed in a vertical polymerization reactor equipped with a rectification column, a nitrogen-supplying tube and a stirrer at the blending molar ratio shown in Table 1, and the mixture was heated gradually to 50-200° C. under nitrogen gas stream and stirred approximately for 12 hours. The samples of the phosphorus/nitrogen-containing compounds obtained were colorless glassy solids at room temperature and all samples were insoluble in toluene. The properties of the phosphorus/nitrogen-containing compounds are shown in Table 1.

Preparative Example 6

A phosphorus-containing compound and a nitrogen-containing compound were placed in a vertical polymerization reactor equipped with a rectification column, a nitrogen-supplying tube, and a stirrer at the blending molar ratio shown in Table 1; a radical initiator (F1) in an amount of 0.1 wt part with respect to 100 wt parts of the phosphorus- and nitrogen-containing compounds was added thereto; and the mixture was heated gradually to 50-200° C. under nitrogen gas stream and stirred approximately for 4 hours. The sample of the phosphorus/nitrogen-containing compound obtained was colorless glassy solid at room temperature and insoluble in toluene. The properties of the phosphorus/nitrogen-containing compound (B6) are shown in Table 1.

Preparative Example 7

A phosphorus-containing compound (A1), 60 wt parts (equimolar to (A1)) of itaconic acid, and 160 wt parts (two molars or more to itaconic acid) of ethylene glycol were placed in a vertical polymerization reactor equipped with a distillation column, a rectification column, a nitrogen-supplying tube, and a stirrer, and the mixture was heated gradually to 120-200° C. under nitrogen gas atmosphere and stirred approximately for 10 hours.

Antimony trioxide and zinc acetate each in an amount of 0.1 wt part were then added thereto, and the mixture was kept at a temperature of 220° C. under a vacuum reduced pressure of less than 1 torr allowing polycondensation reaction and distillation of ethylene glycol simultaneously. The reaction was considered complete approximately after 5 hours, when distillation of ethylene glycol subsided significantly. The properties of the phosphorus-containing compound (A4) obtained are shown in Table 2.

TABLE 1

| | | Preparative Example | | | | | |
|---|---|---|---|---|---|---|---|
| | | 1<br>A2 | 2<br>B1 | 3<br>B2 | 4<br>B3 | 5<br>B4 | 6<br>B5 |
| Blending molar ratio | Phosphorus-containing compound (A1) | 1 | 1 | 1.5 | 2 | 2 | 2 |
| | Nitrogen-containing compound (C1) | 0 | 1 | 1 | 1 | 0 | 1 |
| | Nitrogen-containing compound (C2) | 0 | 0 | 0 | 0 | 1 | 0 |
| Properties | Mw × 10$^{-3}$ | 9.6 | 5.6 | 5.5 | 3.6 | 4.0 | 3.8 |
| | Mw/Mn | 1.6 | 1.4 | 1.4 | 1.2 | 1.3 | 1.4 |
| | Tg (° C.) | 81 | 128 | 135 | 126 | 100 | 131 |
| | Chemical resistance Toluene | A | A | A | A | A | A |
| | Phosphorus content (wt %) | 7.2 | 5.1 | 7.1 | 8.5 | 8.8 | 8.5 |

TABLE 2

|  |  | Preparative Example | | |
|---|---|---|---|---|
|  |  | 7 A4 | 8 B6 | 9 B7 |
| Blending molar ratio | Phosphorus-containing compound (A1) | 1 | 2 | 1.9 |
|  | Nitrogen-containing compound (C1) | 0 | 1 | 1 |
|  | Radical initiator (F1)(*1) | 0 | 0 | 0.1 |
| Properties | Content of crosslinked component (%) | 0 | 0 | 27 |
|  | Mw × 10$^{-3}$ | 9.6 | 3.6 | — |
|  | Mw/Mn | 1.6 | 1.2 | — |
|  | Tg (° C.) | 81 | 126 | 130 |
|  | Chemical resistance   Toluene | A | A | A |
|  | THF | A | A | A |
|  | Phosphorus content (wt %) | 7.2 | 8.5 | 8.3 |

(*1)Addition amount with respect to 100 wt parts of A1 + C1

Preparative Examples 8 and 9

A phosphorus-containing compound and a nitrogen-containing compound are placed in a vertical polymerization reactor equipped with, a rectification column, a nitrogen-supplying tube, and a stirrer at the blending molar ratio shown in Table 2, and the mixtures were heated gradually to 50-200° C. under nitrogen gas stream and stirred approximately for 12 hours. The samples of the phosphorus/nitrogen-containing compounds obtained were colorless glassy solids at room temperature. All samples were insoluble in toluene and THF. The properties of the phosphorus/nitrogen-containing compounds are shown in Table 2.

Preparative Examples 10 and 11

The phosphorus/nitrogen-containing compound obtained in Preparative Example 8 and other additives were dry-blended at the blending composition shown in Table 3 (unit: wt parts), to give mixtures. Each of the mixtures was supplied to a 15 mmφ co-rotation twin-screw vent extruder (KZW15TWIN-45MG, manufactured by Technovel Corporation) through its hopper hole and extruded in a molten state at a cylinder temperature setting of 190-220° C. The obtained samples of the phosphorus/nitrogen-containing compounds were colorless glassy solids at room temperature and all samples were insoluble in toluene and THF. The properties of phosphorus/nitrogen-containing compounds are shown in Table 3.

TABLE 3

|  |  | Preparative Example | |
|---|---|---|---|
|  |  | 10 B8 | 11 B9 |
| Blending composition (part) | Phosphorus/nitrogen-containing compound (B6) | 100 | 100 |
|  | Radical initiator (F2) | 0.2 | 0.5 |
| Properties | Content of crosslinked component (%) | 69.2 | 64.9 |
|  | Mw × 10$^{-3}$ | — | — |
|  | Mw/Mn | — | — |
|  | Tg (° C.) | 138 | 137 |
|  | Chemical resistance   Toluene | A | A |
|  | THF | A | A |
|  | Phosphorus content (wt %) | 8.5 | 8.5 |

Examples 1 to 10

The raw materials shown in Table 4 were dry-blended at the blending composition (unit: wt part) shown therein, to give mixtures. Each of the mixtures was supplied to a 44 mmφ co-rotation twin-screw vent extruder (TEX44, manufactured by Japan Steel Works, Ltd.) through its hopper hole and extruded in a molten state at a cylinder temperature setting of 250-280° C. into pellets. The pellets obtained were injection-molded under the condition described above, to give a test piece, which was evaluated by the evaluation methods described above.

The evaluation results in Examples 1 and 10 are shown in Table 4.

TABLE 4

|  |  | Example | | | | | | | | | |
|---|---|---|---|---|---|---|---|---|---|---|---|
|  |  | 1 | 2 | 3 | 4 | 5 | 6 | 7 | 8 | 9 | 10 |
| Blending composition (part) | Thermoplastic resin (D1) | 100 | 100 | 100 | 100 | 100 | 100 | 100 |  |  |  |
|  | Thermoplastic resin (D2) |  |  |  |  |  |  |  | 100 |  |  |
|  | Thermoplastic resin (D3) |  |  |  |  |  |  |  |  | 100 |  |
|  | Thermoplastic resin (D4) |  |  |  |  |  |  |  |  |  | 100 |
|  | Phosphorus-containing compound (A2) |  |  |  |  |  |  |  |  |  |  |
|  | Phosphorus-containing compound (A3) |  |  |  |  |  |  |  |  |  |  |
|  | Phosphorus/nitrogen-containing compound (B1) | 20 |  |  |  |  |  |  |  |  |  |
|  | Phosphorus/nitrogen-containing compound (B2) |  | 20 |  |  |  |  |  |  |  |  |
|  | Phosphorus/nitrogen-containing compound (B3) |  |  | 20 |  |  | 5 | 40 | 10 | 60 | 40 |
|  | Phosphorus/nitrogen-containing compound (B4) |  |  |  | 20 |  |  |  |  |  |  |
|  | Phosphorus/nitrogen-containing compound (B5) |  |  |  |  | 20 |  |  |  |  |  |
|  | Inorganic filler (E1) |  |  |  |  |  |  |  |  | 51 | 60 |
| Properties | Flame retardancy 1.6 mm thickness | V-2 | V-0 | V-0 | V-0 | V-0 | V-2 | V-0 | V-0 | V-0 | V-0 |
|  | Tensile strength (MPa) | 68 | 61 | 56 | 50 | 65 | 70 | 47 | 60 | 150 | 170 |
|  | Tensile strength retention rate after moist-heat resistance test (%) | 72 | 75 | 70 | 65 | 72 | 78 | 69 | 50 | 53 | 65 |
|  | Evaluation of bleed-out resistance | A | A | A | A | A | A | A | A | A | A |
|  | Bleed-out after moist-heat resistance test | A | A | A | A | A | A | A | A | A | A |

Comparative Examples 1 and 4

Pelletization and injection molding were carried out similarly to Examples 1 and 10 by using the raw materials at the blending composition (unit: wt part) shown in Table 5, to give test pieces, which were then evaluated by evaluation methods similar to those above. The evaluation results obtained in Comparative Examples 1 to 4 are shown in Table 5.

TABLE 5

|  |  | Comparative Example | | | |
|---|---|---|---|---|---|
|  |  | 1 | 2 | 3 | 4 |
| Blending composition (part) | Thermoplastic resin (D1) | 100 |  | 100 |  |
|  | Thermoplastic resin (D2) |  | 100 |  | 100 |
|  | Thermoplastic resin (D3) |  |  |  |  |
|  | Thermoplastic resin (D4) |  |  |  |  |
|  | Phosphorus-containing compound (A2) | 20 | 10 |  |  |
|  | Phosphorus-containing compound (A3) |  |  | 20 | 10 |
|  | Phosphorus/nitrogen-containing compound (B1) |  |  |  |  |
|  | Phosphorus/nitrogen-containing compound (B2) |  |  |  |  |
|  | Phosphorus/nitrogen-containing compound (B3) |  |  |  |  |
|  | Phosphorus/nitrogen-containing compound (B4) |  |  |  |  |
|  | Phosphorus/nitrogen-containing compound (B5) |  |  |  |  |
|  | Inorganic filler (E1) |  |  |  |  |
| Properties | Flame retardancy 1.6 mm thickness | V-0 | V-2 | V-2 | V-0 |
|  | Tensile strength (MPa) | 43 | 61 | 66 | 50 |
|  | Tensile strength retention rate after moist-heat resistance test (%) | 43 | 35 | 35 | 39 |
|  | Evaluation of bleed-out resistance | A | A | B | B |
|  | Bleed-out after moist-heat resistance test | B | B | B | B |

The results in Preparative Examples 1 to 6, Examples 1 to 10, and Comparative Examples 1 to 4 show that the inventive flame retardants are superior in flame retardancy and bleed-out resistance and also superior in moist-heat resistance and chemical resistance.

Examples 11 to 18

The raw materials shown in Table 6 were dry-blended at the blending composition (unit: wt parts) shown therein, to give mixtures. Each of the mixtures was supplied into a 44 mmφ co-rotation twin-screw vent extruder (TEX44, manufactured by Japan Steel Works, Ltd.) through its hopper hole and extruded in a molten state at a cylinder temperature setting of 290-320° C. into pellets. The pellets obtained were injection-molded under the condition above, to give a test piece, which was evaluated by the evaluation methods described above.

The evaluation results obtained in Examples 11 to 18 are shown in Table 6.

Comparative Examples 5 to 8

Pelletization and injection molding were carried out similarly to Examples 11 and 18 by using the raw materials at the blending composition (unit: wt part) shown in Table 7, to give test pieces, which were then evaluated by evaluation methods similar to those above.

The evaluation results obtained in Comparative Examples 5 to 8 are shown in Table 7. The "poor feed defect" shown below Table 7 means that the mixture had low viscosity and was extruded less effectively in the molding machine.

TABLE 6

|  |  | Example | | | | | | | |
|---|---|---|---|---|---|---|---|---|---|
|  |  | 11 | 12 | 13 | 14 | 15 | 16 | 17 | 18 |
| Blending composition (part) | Thermoplastic resin (D3) |  |  |  | 100 | 100 | 100 |  | 100 |
|  | Thermoplastic resin (D4) | 100 | 100 | 100 |  |  |  | 100 |  |
|  | Phosphorus/nitrogen-containing compound (B6) |  |  |  |  |  |  | 40 | 56 |
|  | Phosphorus/nitrogen-containing compound (B7) | 40 |  |  | 56 |  |  |  |  |
|  | Phosphorus/nitrogen-containing compound (B8) |  | 40 |  |  | 56 |  |  |  |
|  | Phosphorus/nitrogen-containing compound (B9) |  |  | 40 |  |  | 56 |  |  |
|  | Inorganic filler (E2) | 60 | 60 | 60 | 67 | 67 | 67 | 60 | 67 |
| Properties | Flame retardancy 1.6 mm thickness | V-0 | V-0 | V-0 | V-0 | V-0 | V-0 | V-0 | V-0 |
|  | Tensile strength (MPa) | 179 | 180 | 182 | 155 | 156 | 160 | 170 | 150 |
|  | Heat resistance on reflow process | A | A | A | A | A | A | B | B |

TABLE 7

|  |  | Comparative Example | | | |
|---|---|---|---|---|---|
|  |  | 5 | 6 | 7 | 8 |
| Blending composition (part) | Thermoplastic resin (D3) |  |  | 100 | 100 |
|  | Thermoplastic resin (D4) | 100 | 100 |  |  |
|  | Phosphorus-containing compound (A3) |  | 40 |  | 56 |
|  | Phosphorus-containing compound (A4) | 40 |  | 56 |  |
|  | Inorganic filler (E2) | 60 | 60 | 60 | 67 |
| Properties | Flame retardancy 1.6 mm thickness | * | * | * | * |
|  | Tensile strength (MPa) | * | * | * | * |
|  | Heat resistance on reflow process | * | * | * | * |

* The mixture was not extruded because of poor feed defect, permitting no evaluation.

The results obtained in Preparative Examples 7 to 11, Examples 11 to 18, and Comparative Examples 5 to 8 show that the inventive flame retardants were superior in flame retardancy, heat resistance, heat resistance on reflow process, and chemical resistance.

The invention claimed is:

1. A flame retardant for thermoplastic resins, comprising a reaction product of a nitrogen-containing compound represented by structural formulae (1) and a phosphorus-containing compound represented by structural formula (2), wherein the flame retardant is insoluble in toluene and has a phosphorus atom content of 5 to 10 wt %, and wherein the weight-average molecular weight (Mw) thereof is 2,000-10,000, Structural formulae (1)

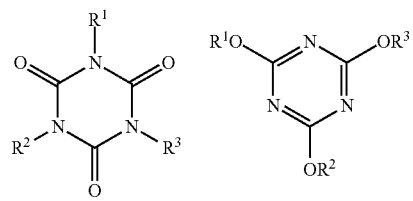

wherein two or more of $R^1$, $R^2$, and $R^3$ are unsaturated bond-containing groups and the other is a hydrogen atom or an organic group other than unsaturated bond-containing groups; and Structural formula (2)

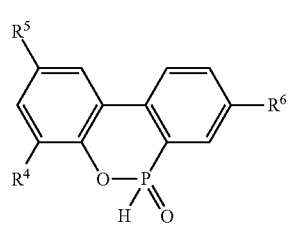

wherein $R^4$, $R^5$, and $R^6$ each are independently a hydrogen atom or an alkyl, cycloalkyl, aryl or aralkyl group.

2. The flame retardant according to claim 1, wherein a ratio (Mw/Mn) of the weight-average molecular weight (Mw) and the number-average molecular weight (Mn) of the flame retardant is 1 to 1.5.

3. A flame retardant for thermoplastic resins, comprising a polymer having the first to third repeating units respectively represented by structural formulae (3) to (5), characterized in that the flame retardant is insoluble in toluene and has a phosphorus atom content of 5 to 10 wt %, and a weight-average molecular weight (Mw) of 2,000 to 10,000:

Structural formulae (3)

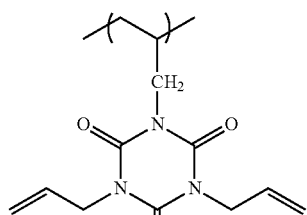

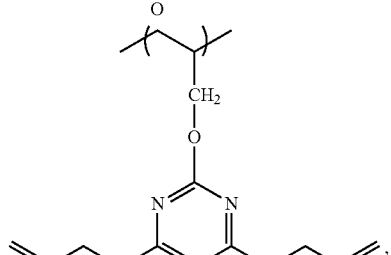

Structural formulae (4)

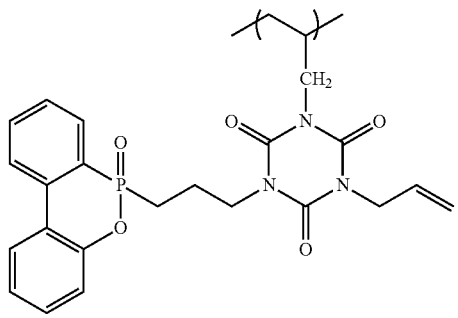

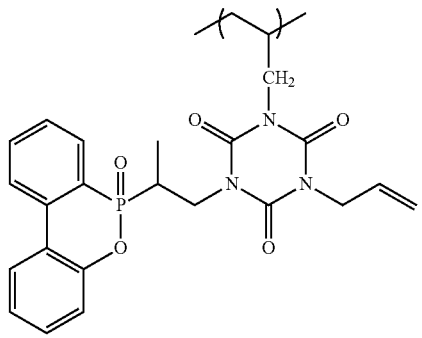

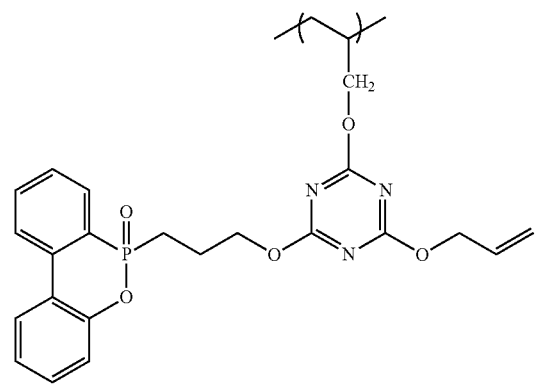
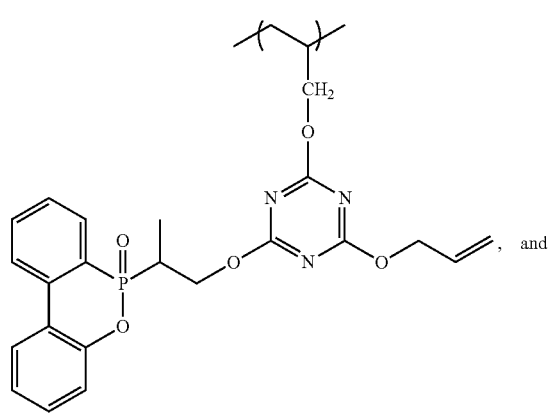
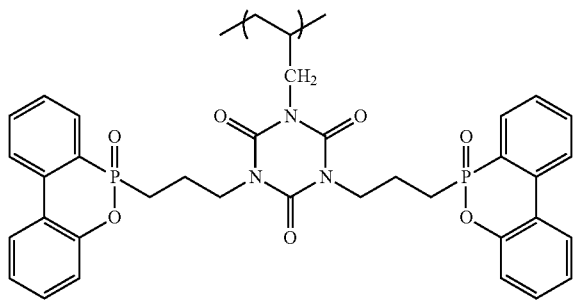
Structural formulae (5)
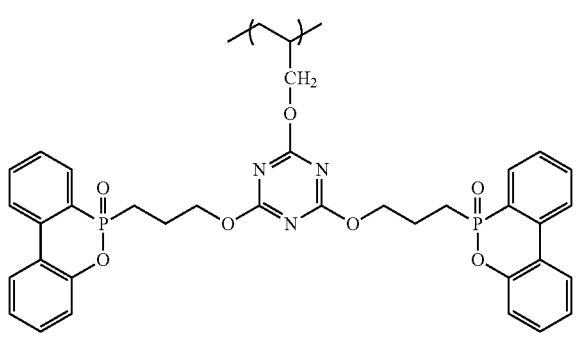
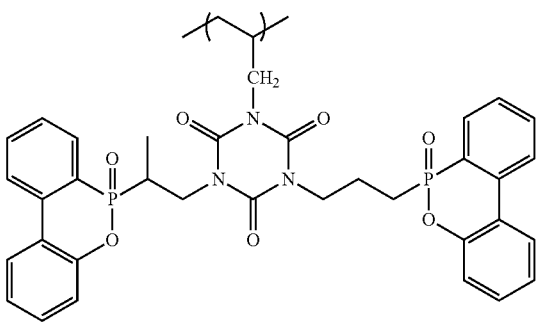
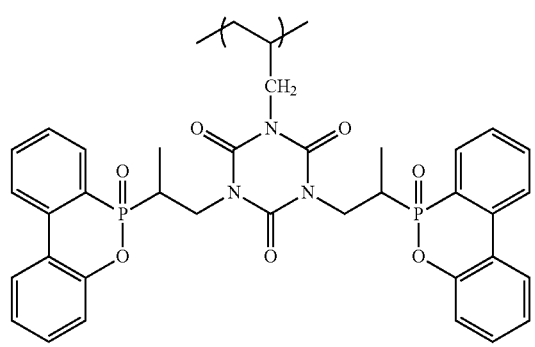
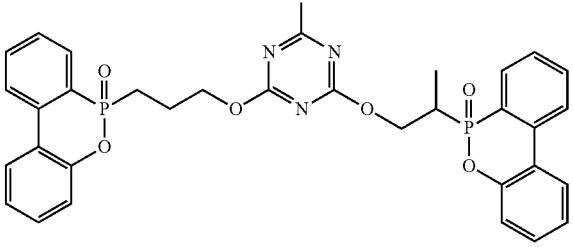
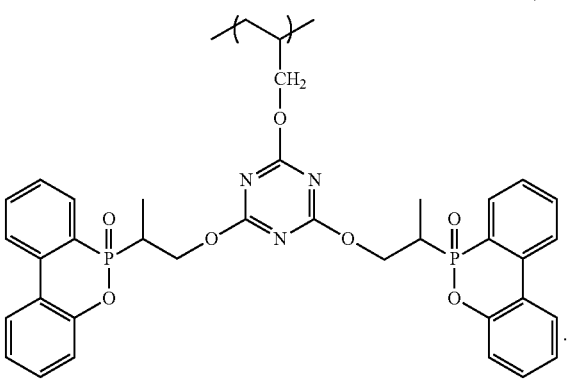
4. A flame retardant for thermoplastic resins, comprising a reaction product of a nitrogen-containing compound represent by structural formula (2),
wherein the flame retardant is insoluble in toluene and has a phosphorus atom content of 5 to 10 wt %, and
wherein a content of the crosslinked component in the flame retardant is 1 wt % or more, Structural formulae (1)

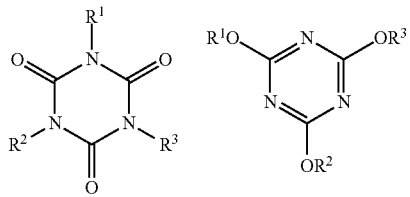

wherein two or more of $R^1$, $R^2$, and $R^3$ are unsaturated bond-containing groups and the other is a hydrogen atom or an organic group other than unsaturated bond-containing groups; and Structural formula (2)

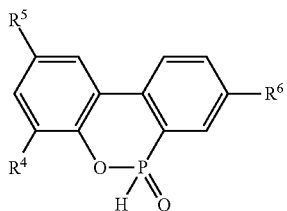

wherein $R^4$, $R^5$, and $R^6$ each are independently a hydrogen atom or an alkyl, cycloalkyl, aryl or aralkyl group.

5. A flame retardant for thermoplastic resins, comprising a polymer having the first to third repeating units respectively represented by structural formulae (3) to (5) and having crosslinked structures respectively represented by structural formulae (6) to (7), wherein the flame retardant is insoluble in toluene, the content of the crosslinked component insoluble in chloroform is 1 wt % or more, and a phosphorus atom content in the flame retardant is 5 to 10 wt %:

Structural formulae (3)

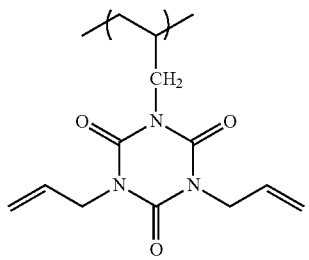

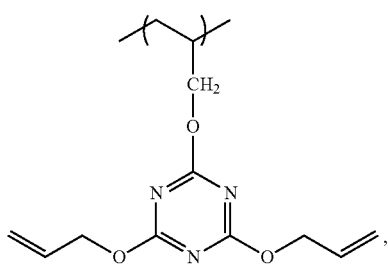

Structural formulae (4)

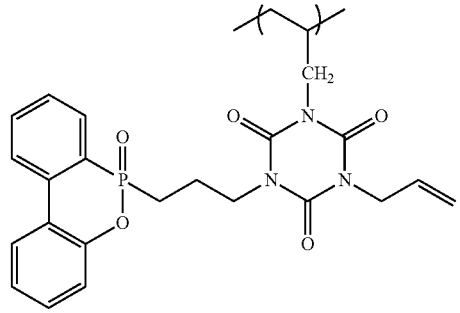

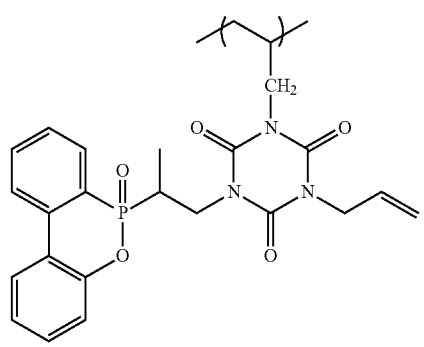

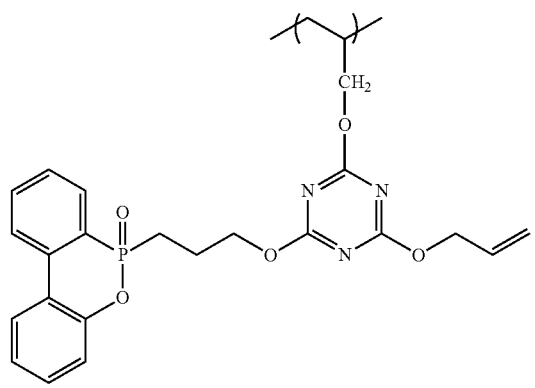

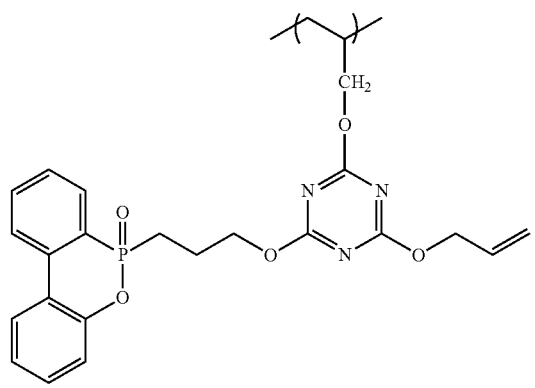

Structural formulae (5)
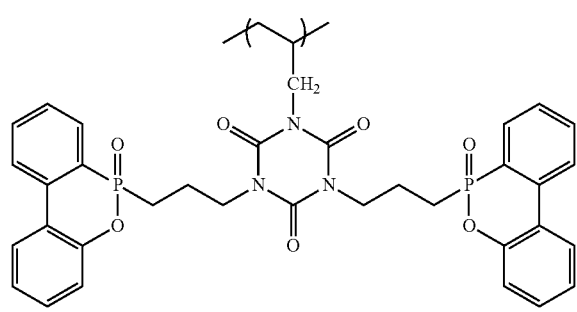
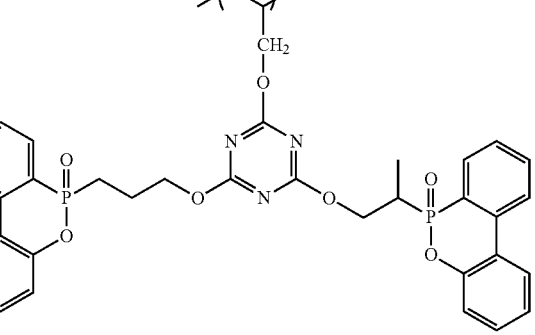
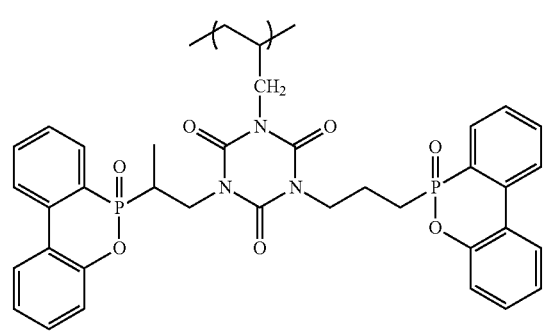
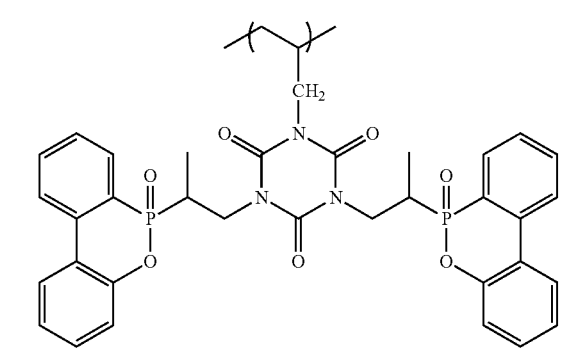
Structural formulae (6)
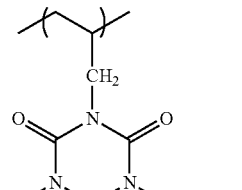
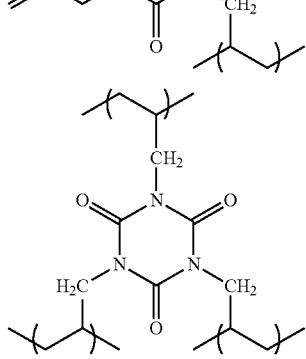
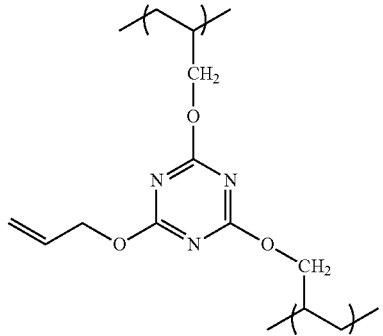

-continued

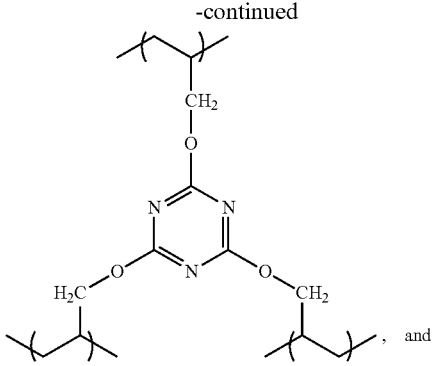

, and

Structural formulae (7)

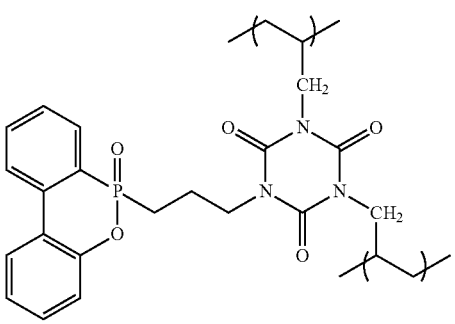

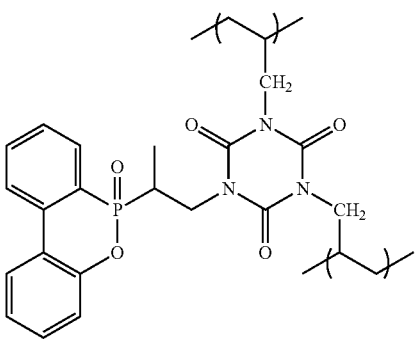

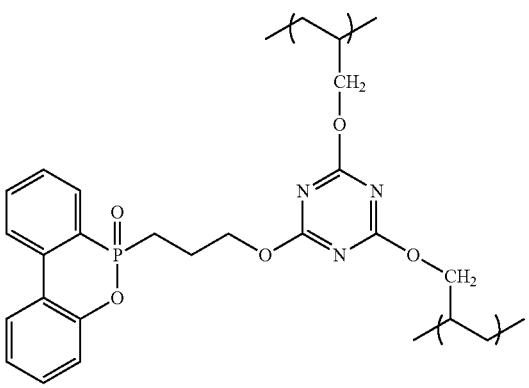

-continued

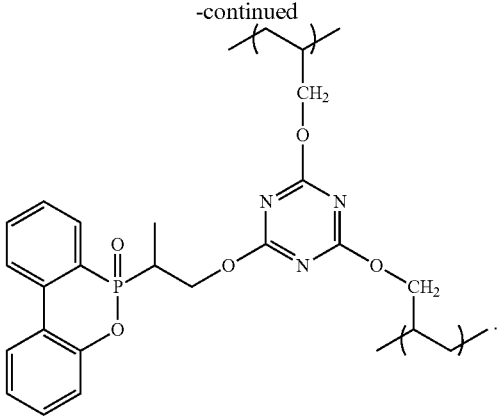

6. A flame-retardant thermoplastic resin composition, comprising 0.1 to 75 wt parts of the flame retardant according to any one of claims 1 to 5 and 100 wt parts of a thermoplastic resin.

7. The flame-retardant thermoplastic resin composition according to claim 6, wherein the thermoplastic resin is one or more resins selected from the group consisting of polyethylene terephthalate resins, polybutylene terephthalate resins, aliphatic polyamide resins, semi-aromatic polyamide resins, polycarbonate resins, and modified polyphenylene oxide-based resins.

8. A method of producing the flame retardant according to any one of claims 1 to 3, comprising a step of adding the phosphorus-containing compound to the nitrogen-containing compound and the polymerized nitrogen-containing compound while polymerizing the nitrogen-containing compound, by heating a mixture containing a nitrogen-containing compound represented by the structural formulae (1) and a phosphorus-containing compound represented by the structural formula (2) at a molar ratio of 1:1.0 to 2.5 to 180-240° C. at a heating rate of 1° C.-100° C./hour under nitrogen atmosphere.

9. A method of producing the flame retardant according to any one of claim 4 or 5, comprising a step of adding the phosphorus-containing compound to the nitrogen-containing compound and the polymerized nitrogen-containing compound while polymerizing the nitrogen-containing compound, and a crosslinking step of reacting unreacted unsaturated bond-containing groups with each other directly or by using a crosslinking agent, by heating a mixture containing a nitrogen-containing compound represented by the structural formulae (1) and a phosphorus-containing compound represented by the structural formula (2) at a molar ratio of 1:1.0 to 2.5 to 180-240° C. at a heating rate of 1° C.-100° C./hour under nitrogen atmosphere.

10. The method according to claim 9, wherein the crosslinking step include a crosslinking step using an extruder or a batch kneader.

\* \* \* \* \*